(12) United States Patent
Sauerteig et al.

(10) Patent No.: US 12,119,684 B2
(45) Date of Patent: Oct. 15, 2024

(54) BATTERY PACK, TREATMENT SYSTEM AND METHOD FOR THE PRODUCTION OF A BATTERY PACK

(71) Applicants: Andreas Stihl AG & Co. KG, Waiblingen (DE); Murata Manufacturing Co., Ltd., Nagaokakyo (JP)

(72) Inventors: Daniel Sauerteig, Kernen im Remstal (DE); Julien Scholl, Waiblingen (DE); Kenichi Ozawa, Koriyama (JP); Takayuki Sato, Koriyama (JP); Daiki Misawa, Koriyama (JP); Daniel Wagner, Winterbach (DE); Marcel Wilka, Boebingen (DE); Martin Schurr, Mutlangen (DE); Uwe Bossmann, Esslingen a.N. (DE); Dirk Liepold, Fellbach (DE)

(73) Assignees: Andreas Stihl AG & Co. KG, Waiblingen (DE); Murata Manufacturing Co., Ltd, Nagaokakyo (JP)

( * ) Notice: Subject to any disclaimer, the term of this patent is extended or adjusted under 35 U.S.C. 154(b) by 207 days.

(21) Appl. No.: 16/869,824

(22) Filed: May 8, 2020

(65) Prior Publication Data
US 2020/0358055 A1      Nov. 12, 2020

(30) Foreign Application Priority Data
May 10, 2019   (EP) .................................... 19173820

(51) Int. Cl.
*H01M 10/00*   (2006.01)
*H01M 10/48*   (2006.01)
(Continued)

(52) U.S. Cl.
CPC ......... *H02J 7/0024* (2013.01); *H01M 10/482* (2013.01); *H01M 10/486* (2013.01);
(Continued)

(58) Field of Classification Search
CPC .. H01M 50/209; H01M 50/213; H01M 50/48; H01M 10/6235; H01M 50/516;
(Continued)

(56) References Cited

U.S. PATENT DOCUMENTS 7,846,577 B2   12/2010   Kozu et al.
10,439,190 B2  10/2019   Glauning
(Continued)

FOREIGN PATENT DOCUMENTS

| CN | 1881657 A | 12/2006 |
| CN | 1898819 A | 1/2007 |

(Continued)

OTHER PUBLICATIONS

Machine translation of JP 2006156171 A, obtained Mar. 2023 (Year: 2006).*

(Continued)

*Primary Examiner* — Nicholas P D'Aniello
(74) *Attorney, Agent, or Firm* — Crowell & Moring LLP

(57) ABSTRACT

A battery pack supplies an electrically driven treatment apparatus with an electric driving power and includes a plurality of accumulator cells having cell contacts; at least one circuit board electrically connected to the cell contacts; and a battery pack housing having a first battery pack housing part and a second battery pack housing part. The first battery pack housing part and the second battery pack housing part are closed by each other. The accumulator cells are disposed within the battery pack housing. The cell contacts and the circuit board are disposed within the second battery pack housing part. The second battery pack housing (Continued)

part is configured as a mold for a casting compound, and the cell contacts and the at least one circuit board are enclosed by the casting compound.

15 Claims, 17 Drawing Sheets

(51) Int. Cl.
| | |
|---|---|
| *H01M 50/178* | (2021.01) |
| *H01M 50/211* | (2021.01) |
| *H01M 50/213* | (2021.01) |
| *H01M 50/296* | (2021.01) |
| *H01M 50/519* | (2021.01) |
| *H01M 50/55* | (2021.01) |
| *H01M 50/553* | (2021.01) |
| *H01M 50/557* | (2021.01) |
| *H02J 7/00* | (2006.01) |
| *H01M 50/48* | (2021.01) |
| *H01M 50/516* | (2021.01) |
| *H01M 50/566* | (2021.01) |

(52) U.S. Cl.
CPC ....... *H01M 50/178* (2021.01); *H01M 50/211* (2021.01); *H01M 50/213* (2021.01); *H01M 50/296* (2021.01); *H01M 50/519* (2021.01); *H01M 50/55* (2021.01); *H01M 50/553* (2021.01); *H01M 50/557* (2021.01); *H01M 50/48* (2021.01); *H01M 50/516* (2021.01); *H01M 50/566* (2021.01)

(58) Field of Classification Search
CPC ............ H01M 50/566; H01M 10/613; H01M 10/647; H01M 2010/4271; H01M 10/486; H01M 10/63; H01M 50/178; H01M 50/211; H01M 50/296; H01M 50/519; H01M 50/55; H01M 50/553; H01M 50/557; H01M 10/482; H01M 10/0436; H01M 2220/30; H01M 10/4207; H01M 10/0525; H01M 10/058; H02J 7/0024; Y02E 60/10; Y02P 70/50

See application file for complete search history.

(56) References Cited

U.S. PATENT DOCUMENTS

| | | | |
|---|---|---|---|
| 2002/0034683 | A1 | 3/2002 | Takeshita et al. |
| 2006/0024575 | A1* | 2/2006 | Robinson .......... B29C 45/14467 |
| | | | 429/185 |
| 2007/0202364 | A1* | 8/2007 | Uh ...................... H01M 50/166 |
| | | | 429/174 |
| 2008/0090137 | A1* | 4/2008 | Buck ................. H01M 10/6571 |
| | | | 429/142 |
| 2008/0233475 | A1 | 9/2008 | Kozu et al. |
| 2010/0221584 | A1* | 9/2010 | Reber ................. H01M 50/213 |
| | | | 429/7 |
| 2014/0377622 | A1 | 12/2014 | Glauning |
| 2016/0126531 | A1 | 5/2016 | Kim et al. |
| 2016/0218328 | A1* | 7/2016 | Schmidt ............. H01M 10/049 |
| 2017/0155104 | A1* | 6/2017 | Yoneda ............... H01M 50/264 |
| 2017/0309878 | A1* | 10/2017 | Kepler ............... H01M 50/367 |

FOREIGN PATENT DOCUMENTS

| | | |
|---|---|---|
| CN | 101820050 A | 9/2010 |
| CN | 205376591 U | 7/2016 |
| CN | 208112979 U | 11/2018 |
| CN | 208237826 U | 12/2018 |
| DE | 10 2009 040 128 A1 | 3/2011 |
| DE | 10 2013 211 459 A1 | 12/2014 |
| EP | 1 727 223 A1 | 11/2006 |
| JP | 2006156171 A * | 6/2006 |
| JP | 2009-218012 A | 9/2009 |
| JP | 2011-113721 A | 6/2011 |
| WO | WO 2011/027328 A2 | 3/2011 |

OTHER PUBLICATIONS

Chinese-language Office Action issued in Chinese Application No. 202010382466.8 dated Aug. 31, 2023 with partial English translation (14 pages).

Japanese-language Office Action issued in Japanese Application No. 2020-081683 dated Jun. 4, 2024 with English translation (13 pages).

Chinese-language Office Action issued in Chinese Application No. 202010382466.8 dated Jul. 8, 2024 with English translation (24 pages).

* cited by examiner

BATTERY PACK, TREATMENT SYSTEM AND METHOD FOR THE PRODUCTION OF A BATTERY PACK

FIELD OF APPLICATION AND PRIOR ART

The invention relates to a battery pack for supplying an electrically driven treatment apparatus with electric driving power, to a treatment system including such a battery pack and an electrically driven treatment apparatus, and to a method for the production of a battery pack for supplying an electrically driven treatment apparatus with electric driving power.

Problem and Solution

The invention is based on the problem of providing a battery pack for supplying an electrically driven treatment apparatus with electric driving power, a treatment system including such a battery pack and an electrically driven treatment apparatus, and a method for the production of a battery pack for supplying an electrically driven treatment apparatus with electric driving power, wherein the battery pack and the method each have improved properties.

The invention solves the problem by providing a battery pack, by providing a treatment system, and by providing a method, according to the claimed invention. Advantageous developments and/or configurations of the invention are described and claimed herein.

The battery pack according to the invention is designed or configured for supplying, in particular automatic supplying, of an electrically driven treatment apparatus, in particular a treatment apparatus for gardening, forestry and/or building construction, with electric driving power. The battery pack includes a plurality of accumulator cells or battery cells, at least one circuit board and a battery pack housing. The accumulator cells have cell contacts. The at least one circuit board is electrically connected to the cell contacts. The battery pack housing has a first battery pack housing part and a second battery pack housing part. The first battery pack housing part and the second battery pack housing part are closed by each other. In particular all of the accumulator cells are, in particular completely, disposed within the battery pack housing, in particular the first battery pack housing part and the second battery pack housing part.

Additionally, in particular all of, the cell contacts and the at least one circuit board are, in particular completely, disposed within the second battery pack housing part. The second battery pack housing part is designed or configured as a mold for a casting compound.

In particular all of the cell contacts and the at least one circuit board are, in particular completely, enclosed by, in particular in or within, the casting compound, in particular within the second battery pack housing part.

In addition or as an alternative, the at least one circuit board is disposed, in particular completely, within the battery pack housing. The one battery pack housing part, in particular the second battery pack housing part, has at least one thread. The other battery pack housing part, in particular the first battery pack housing part, has at least one head abutment surface. The head abutment surface is disposed on an end of the other battery pack housing part adjacent or close to the one battery pack housing part. The battery pack has at least one screw. The screw is screwed into the thread for mechanical connection of the one battery pack housing part and the other battery pack housing part to each other, and a screw head bears on the head abutment surface.

The battery pack housing allows, in particular the first battery pack housing part and the second battery pack housing part allow, protection of the accumulator cells and the at least one circuit board, in particular from mechanical stress and/or physical contact.

The embodiment of the second battery pack housing part as a casting mold thereby allows a dual function or a synergy effect. Moreover, this feature allows that the cell contacts and the at least one circuit board can be enclosed by the casting compound in time after arrangement within the second battery pack housing part, and thus production of the battery pack in a relatively simple way. In particular, the casting compound can provide protection of the accumulator cells and the at least one circuit board against moisture and/or mechanical stress and/or physical contact and/or allow electrical insulation and/or heat dissipation, in particular of the cell contacts and/or the at least one circuit board.

The arrangement of the head abutment surface on the adjacent end of the other battery pack housing part allows that relatively less structural length need to be provided for the screw in the other battery pack housing part, and thus can be utilized otherwise for the other battery pack housing part and/or the one battery pack housing part.

In particular, the accumulator cells can be configured for supplying the treatment apparatus with the driving power. In addition or as an alternative, the accumulator cells can be in each case individual rechargeable storage elements for electric energy working on an electrochemical basis. In particular, the accumulator cells can be lithium-ion accumulator cells. Further in addition or as an alternative, the accumulator cells can be electrically interconnected, in particular can be connected in series or in parallel. Further in addition or as an alternative, the cell contacts, in particular in each case, of next accumulator cells can be electrically connected to each other. Further in addition or as an alternative, the accumulator cells can be similar or identical, in particular of the same type and/or the same construction. Further in addition or as an alternative, the cell contacts can be referred to as terminals, poles or connector electrodes. Further in addition or as an alternative, the cell contacts can be voltaged, in particular have voltaged surfaces.

The at least one circuit board can be voltaged, in particular can have voltaged surfaces.

In time before arrangement and/or in time before enclosing, the first battery pack housing part and the second battery pack housing part can be separate from each other or do not need to be closed by each other, for disposing the accumulator cells and the at least one circuit board within the battery pack housing and/or for enclosing the cell contacts and the at least one circuit board by the casting compound. In addition or as an alternative, an opening of the first battery pack housing part can face the second battery pack housing part and/or an opening of the second battery pack housing part can face the first battery pack housing part. Further in addition or as an alternative, the first battery pack housing part and the second battery pack housing part can adjoin or physically contact each other in a connecting direction, in particular longitudinal direction. Further in addition or as an alternative, the battery pack housing can be an outer housing or an outermost housing of the battery pack or be accessible from the outside.

The casting compound can be electrically insulating and/or heat conducting. In addition or as an alternative, the casting compound can be a casting resin, in particular a synthetic resin. Further in addition or as an alternative, the casting compound can be in a solid state.

The thread and/or the screw can extend in the connecting direction. In addition or as an alternative, the thread and/or the screw can be accessible from the outside of the battery pack housing.

Disposed on the adjacent end of the other battery pack housing part can mean that the head abutment surface can be disposed spaced from the adjacent end of the other battery pack housing part at a maximum of 20 millimeters (mm), in particular a maximum of 10 mm, in particular a maximum of 5 mm.

In a development of the invention, the first battery pack housing part is a housing container and the second battery pack housing part is a housing cover. This allows that a relatively low amount of casting compound can be sufficient for enclosing the cell contacts and the at least one circuit board, in particular for filling, in particular complete filling, of the second battery pack housing part. In particular, the housing cover can be shorter in the connecting direction than the housing container. In addition or as an alternative, the accumulator cells can have cell shells, wherein the cell shells can be disposed within the housing container, in particular completely within the housing container.

In a development of the invention, the accumulator cells have cell shells or outer shells. The casting compound reaches at least up to, in particular all of, the cell shells.

In addition or as an alternative, the casting compound reaches, in particular exactly, up to an end of the second battery pack housing part adjacent or close to the first battery pack housing part.

In addition or as an alternative, the casting compound reaches at least up to an end of the first battery pack housing part adjacent or close to the second battery pack housing part.

The reaching up to the cell shells allows that the cell contacts can be enclosed completely by the casting compound.

The reaching up to the adjacent end of the second battery pack housing part and/or up to the adjacent end of the first battery pack housing part allows casting or blocking and/or sealing of the battery pack housing, in particular of a joint area or interface between the first battery pack housing part and the second battery pack housing part, and/or an additional mechanical connection of the first battery pack housing part and the second battery pack housing part to each other.

In particular, the cell contacts and the cell shells, in particular in each case, can be electrically insulated from each other, in particular that the cell shells can be non-voltaged. In addition or as an alternative, the cell shells can partially not be enclosed by the casting compound, in particular to allow that gas can escape from the cell shells.

The casting compound does not need to or cannot reach further than up to the adjacent end of the second battery pack housing part, in particular in the connecting direction. In addition or as an alternative, the first battery pack housing part and the second battery pack housing part can cover or overlap each other in the connecting direction, in particular the second battery pack housing part on the outside the first battery pack housing part on the inside.

In a development of the invention, the cell contacts, in particular all of the cell contacts, and the at least one circuit board are enclosed by, in particular in or within, the casting compound, in particular only, in a common casting block, in particular a single common casting block. This allows that the cell contacts and the at least one circuit board can be enclosed by the casting compound in time after arrangement within the second battery pack housing part during, in particular only, a common casting step, in particular a single common casting step. In addition or as an alternative, this allows a particularly good electrical insulation of the cell contacts and the at least one electrical circuit board.

In a development of the invention, the accumulator cells, in particular all of the accumulator cells, are designed or configured and disposed in a cell block, in particular a stack, such that, in particular all of, the cell contacts are arranged, in particular only, on a common contact side, in particular a single common contact side, of the cell block. This allows a particularly simple design of the battery pack and, thus, production of the battery pack in a particularly simple way. In particular, the cell block can be or will be disposed within the second battery pack housing part with the contact side ahead, in particular counter to the connecting direction. In addition or as an alternative, the cell block with the contact side can be enclosed by, in particular in or within, the casting compound. Further in addition or as an alternative, the contact side can be referred to as the casting side. Further in addition or as an alternative, the cell block can be cuboid in shape, and in particular, the contact side can be a side of the cuboid.

In a development of the invention, the at least one circuit board is disposed, in particular only, on the contact side, in particular on the cell block, in particular with a board plane in parallel to the contact side. This allows a relatively compact structural design of the battery pack. At the same time, this allows that the circuit board can be specifically close to the cell contacts. In particular, on the cell block can mean that the circuit board can be disposed spaced from the cell block at a maximum of 20 mm, in particular a maximum of 10 mm, in particular a maximum of 5 mm.

In a development of the invention, the accumulator cells, in particular all of the accumulator cells, are pouch cells, and the cell contacts, in particular all of the cell contacts, are cell tabs. This allows a relatively compact structural design of the battery pack. In particular, the pouch cells can be flat cells. In addition or as an alternative, a surface of the pouch cells can be rectangular. Further in addition or as an alternative, the pouch cells can be disposed in the stack, where present, one on top of the other or superimposed. Further in addition or as an alternative, the pouch cells, in particular in each case, can have the cell tabs on a same border or a same edge, in particular of the cell shell. Further in addition or as an alternative, the cell tabs can be referred to as contact tabs.

In a development of the invention, the at least one circuit board holds measurement electronics. The measurement electronics are designed or configured for measuring, in particular automatic measuring, of properties, in particular values of the properties, in particular of all, of the accumulator cells.

In addition or as an alternative, the at least one circuit board holds power electronics. The power electronics are designed or configured for controlling, in particular automatic controlling, in particular stopping, the output of electric driving power from the battery pack and/or an input of electric charging power to the battery pack, in particular in response to the measured properties, where present.

In addition or as an alternative, the at least one circuit board holds user interface electronics and/or transmission electronics. The user interface electronics are designed or configured for interaction, in particular automatic interaction, with a user. The transmission electronics are designed or configured for wireless transmission, in particular automatic wireless transmission, of at least one operating parameter and/or operating condition.

The measurement electronics allow to detect safety-critical conditions of the accumulator cells. The power electronics allow to keep safety-critical conditions of the accumulator cells, and thus of the battery pack, low or even prevent them at all.

In particular, the properties can be voltages. In particular, the voltages can be medium voltages.

The user interface electronics can be configured for output of a charging condition of the battery pack. In addition or as an alternative, the transmission electronics can be configured for unidirectional or bidirectional transmission of the at least one operating parameter and/or operating condition.

In a development of the invention, the battery pack has a plurality of battery pack contacts. The battery pack contacts are designed or configured for electrical connection of the battery pack and the treatment apparatus together for supplying the treatment apparatus with the electric driving power from the battery pack. Furthermore, the battery pack contacts, in particular all of the battery pack contacts, are disposed, in particular only, on an end of the first battery pack housing part remote from, in particular at maximum remote from, the second battery pack housing part. This allows that the battery pack contacts do not need to or cannot be enclosed by the casting compound.

In particular, the battery pack contacts can be voltaged, in particular have voltaged surfaces. In addition or as an alternative, disposed on the remote end of the first battery pack housing part can mean that the battery pack contacts can be disposed spaced from the remote end of the first battery pack housing part at a maximum of 20 mm, in particular a maximum of 10 mm, in particular a maximum of 5 mm. Further in addition or as an alternative, the battery pack contacts can be disposed on a side of the cell block opposite the contact side, where present.

In a development of the invention, the other battery pack housing part, in particular the first battery pack housing part, has at least one groove, in particular for guiding the battery pack in mechanical connection to the treatment apparatus. The groove extends on the head abutment surface in prolongation of the thread. This allows disposing of the screw in the groove and from there to screw it into the thread. In particular, the groove can adjoin the head abutment surface. In addition or as an alternative, the groove can extend in the connecting direction. Further in addition or as an alternative, the groove can be accessible from the outside of the battery pack housing.

In particular, the second battery pack housing part can comprise the thread and the first battery pack housing part can comprise the head abutment surface, and in particular the groove. Thereby, relatively less structural length need to be provided for the screw in the first battery pack housing part and thus be utilized for the groove and/or, in particular with predetermined groove length and with predetermined battery pack housing length, for a relatively great length of the second battery pack housing part, in particular in the connecting direction, and thus for a relatively large amount of casting compound within the second battery pack housing part.

In a development of the invention, the first battery pack housing part has a number of air openings, in particular a number of air inlet openings. The number of air openings are disposed on an end of the first battery pack housing part adjacent or close to the second battery pack housing part, in particular between two grooves, where present. This allows that cooling air for cooling the accumulator cells, in particular the cell shells, can flow along the accumulator cells a relatively long way, in particular if the second battery pack housing part can have the thread and the first battery pack housing part can have the head abutment surface, and in particular the groove. In particular, the casting compound does not need to or cannot reach up to the number of air openings. In addition or as an alternative, the first battery pack housing part can have a further number of air openings, in particular a number of air outlet openings, disposed on an end of the first battery pack housing part remote from the second battery pack housing part for a cooling air flow from the one number of air openings, in particular a number of air inlet openings, passing the accumulator cells to the other number of air openings, in particular the number of air outlet openings, for cooling the accumulator cells. Further in addition or as an alternative, disposed on the adjacent end of the first battery pack housing part can mean that the number of air openings can be disposed spaced from the adjacent end of the first battery pack housing part at maximum 20 mm, in particular a maximum of 10 mm, in particular a maximum of 5 mm.

In a development of the invention, the battery pack has, in particular the accumulator cells have, a maximum electric driving power of a minimum of 1 kilowatt (kW), in particular a minimum of 2 kW, and/or of a maximum of 10 kW, in particular a maximum of 5 kW.

In addition or as an alternative, the battery pack has, in particular the accumulator cells have, a nominal voltage, in particular an electrical nominal voltage, of a minimum of 10 Volts (V), in particular a minimum of 20 V, and/or of a maximum of 100 V, in particular a maximum of 50 V.

In addition or as an alternative, the battery pack has, in particular the accumulator cells have, a maximum energy content, in particular an electrical maximum energy content, of a minimum of 100 Watt hours (Wh), in particular a minimum of 200 Wh, and/or of a maximum of 1000 Wh, in particular a maximum of 500 Wh.

In addition or as an alternative, the battery pack has a mass of a minimum of 0.5 kilograms (kg), in particular a minimum of 1 kg, and/or of a maximum of 10 kg, in particular a maximum of 5 kg.

In addition or as an alternative, the battery pack, in particular the battery pack housing, has a height of a minimum of 2.5 centimeters (cm) and/or of a maximum of 10 cm, and/or a width of a minimum of 5 cm and/or of a maximum of 20 cm, and/or a depth or length, in particular in the connecting direction, of a minimum of 7.5 cm and/or of a maximum of 30 cm.

The treatment system according to the invention comprises a battery pack, in particular the battery pack, as described above and an electrically driven treatment apparatus, in particular the electrically driven treatment apparatus. The battery pack and the treatment apparatus are designed or configured for electrical connection with each other for supplying, in particular automatic supplying, the treatment apparatus electric driving power from the battery pack.

In particular, the treatment system according to the invention can be a treatment system for gardening, forestry and/or building construction. In addition or as an alternative, the treatment apparatus can be a treatment apparatus for gardening, forestry and/or building construction. Further in addition or as an alternative, the treatment apparatus can be a hand-guided, in particular floor-guided or hand-held, treatment apparatus. In particular hand-guided, in particular hand-held, treatment apparatus can mean that the treatment apparatus can have a maximum mass of 50 kilograms (kg), in particular of 20 kg, in particular of 10 kg.

Further in addition or as an alternative, the treatment apparatus can include an electric drive motor. Further in addition or as an alternative, the battery pack and the treatment apparatus can be configured for detachable electrical connection with each other, in particular without using a tool and/or without destruction, particularly by using plug connectors. Further in addition or as an alternative, the battery pack and the treatment apparatus can be configured for, in particular detachable, mechanical connection with each other, in particular without using a tool and/or detachable without destruction. In particular, the treatment apparatus can be configured for holding the battery pack.

In a development of the invention, the treatment apparatus has a battery accommodation, in particular a battery compartment. The battery accommodation is designed or configured for accommodating the battery pack.

In a development of the invention, the treatment apparatus is a saw, a pole pruner, a clearing saw, a brush cutter, hedge shears, a hedge cutter, a blower device, a leaf blower, a lopper, a cutoff grinder, a sweeper device, a sweeper roller, a sweeper brush, a lawn mower, a dethatcher, or a grass trimmer.

The method according to the invention for the production of a battery pack, in particular the battery pack, in particular as described above, for supplying an electrically driven treatment apparatus, in particular the electrically driven treatment apparatus, with an electric driving power comprises the steps:
a) disposing cell contacts, in particular the cell contacts, of a plurality of accumulator cells, in particular the accumulator cells, and at least one circuit board, in particular the circuit board, wherein the at least one circuit board is electrically connected to the cell contacts, within a second battery pack housing part, in particular the second battery pack housing part, of a battery pack housing, in particular the battery pack housing, wherein the second battery pack housing part is configured as a mold for a casting compound, in particular the casting compound.
b) enclosing the cell contacts and the at least one circuit board by the casting compound, in particular in time after the step a).
c) disposing the accumulator cells within the battery pack housing and closing the second battery pack housing part and a first battery pack housing part, in particular the first battery pack housing part, of the battery pack housing by each other, in particular in time after the step b).

The method can allow the same advantages as the battery pack described above.

In particular, in step a) and/or in step b) the first battery pack housing part and the second battery pack housing part can be remote from each other or do not need to be closed by each other. In addition or as an alternative, the step b) can comprise: pouring or supplying the casting compound in the second battery pack housing part, in particular in a liquid state. Further in addition or as an alternative, the step c) can comprise: disposing the accumulator cells in the first battery pack housing part.

In a development of the invention, the step c) comprises: disposing and closing while the casting compound is in a liquid state. The method comprises the step: d) hardening the casting compound to a solid state, in particular in time after the step c). This can allow casting or blocking and/or sealing of the battery pack housing, in particular of a joint area or interface between the first battery pack housing part and the second battery pack housing part, and/or an additional mechanical connection of the first battery pack housing part and the second battery pack housing part to each other. In addition or as an alternative, this can allow compensation of manufacturing and/or production tolerances of the first battery pack housing part and/or the second battery pack housing part, in particular in contrast to disposing and closing while the casting compound can be in a solid state.

BRIEF DESCRIPTION OF THE DRAWINGS

Further advantages and aspects of the invention can be gathered from the claims and from the following description of preferred exemplary embodiments of the invention, which will be explained hereinbelow with reference to the figures. Therein:

DETAILED DESCRIPTION OF THE EXEMPLARY EMBODIMENTS

FIGS. 1 to 17 show a battery pack 1 for supplying an electrically driven treatment apparatus 101 with an electric driving power AL and a method for the production of the battery pack 1 for supplying the electrically driven treatment apparatus 101 with an electric driving power AL.

Figure 7:
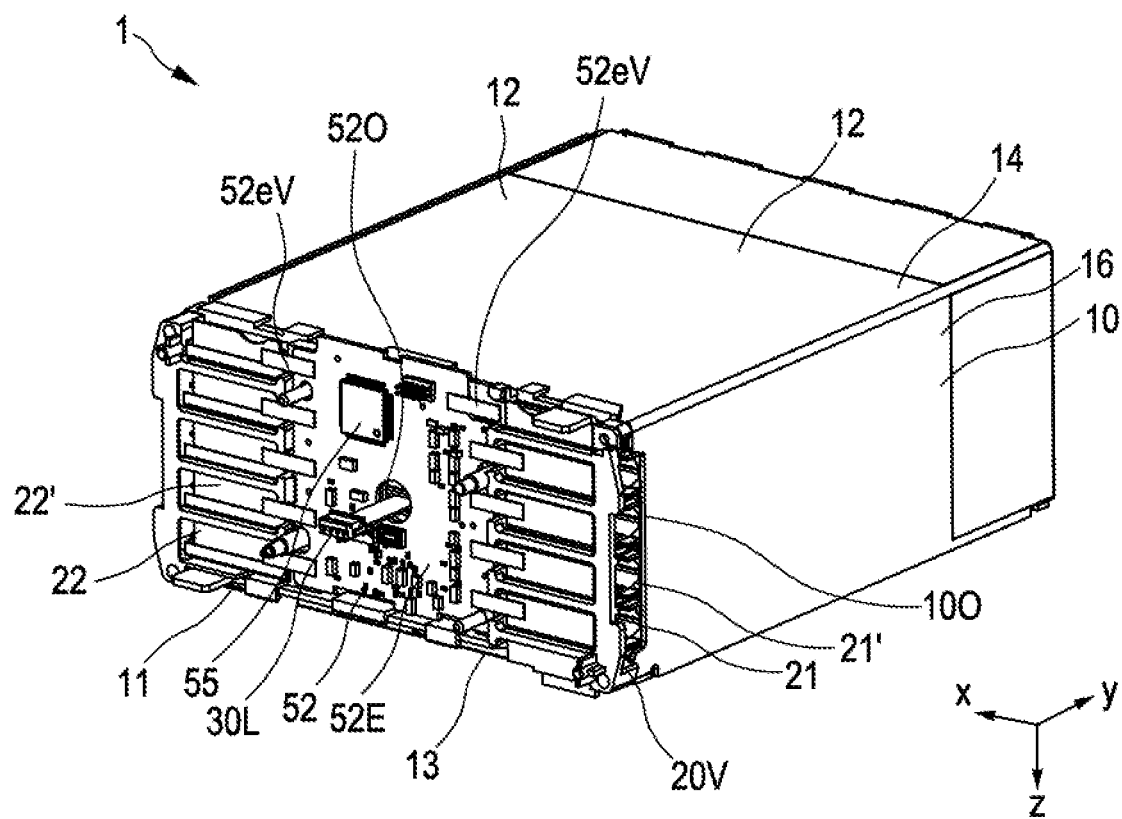
FIG. 7 shows a perspective view of the first stack housing part, the stack, the second stack housing part and a circuit board of the battery pack from FIG. 1.

The battery pack 1 comprises a plurality of accumulator cells 21, at least one circuit board 52, 53, 54 and a battery pack housing 80. The accumulator cells 21 have cell contacts 22. The at least one circuit board 52, 53, 54 is electrically connected to the cell contacts 22, as illustrated in FIGS. 7, 14 and 15. The battery pack housing 80 has a first battery pack housing part 81 and a second battery pack housing part 82. The first battery pack housing part 81 and the second battery pack housing part 82 are closed by each other, as illustrated in FIGS. 13 to 17. The accumulator cells 21 are disposed within the battery pack housing 80.

Figure 13:
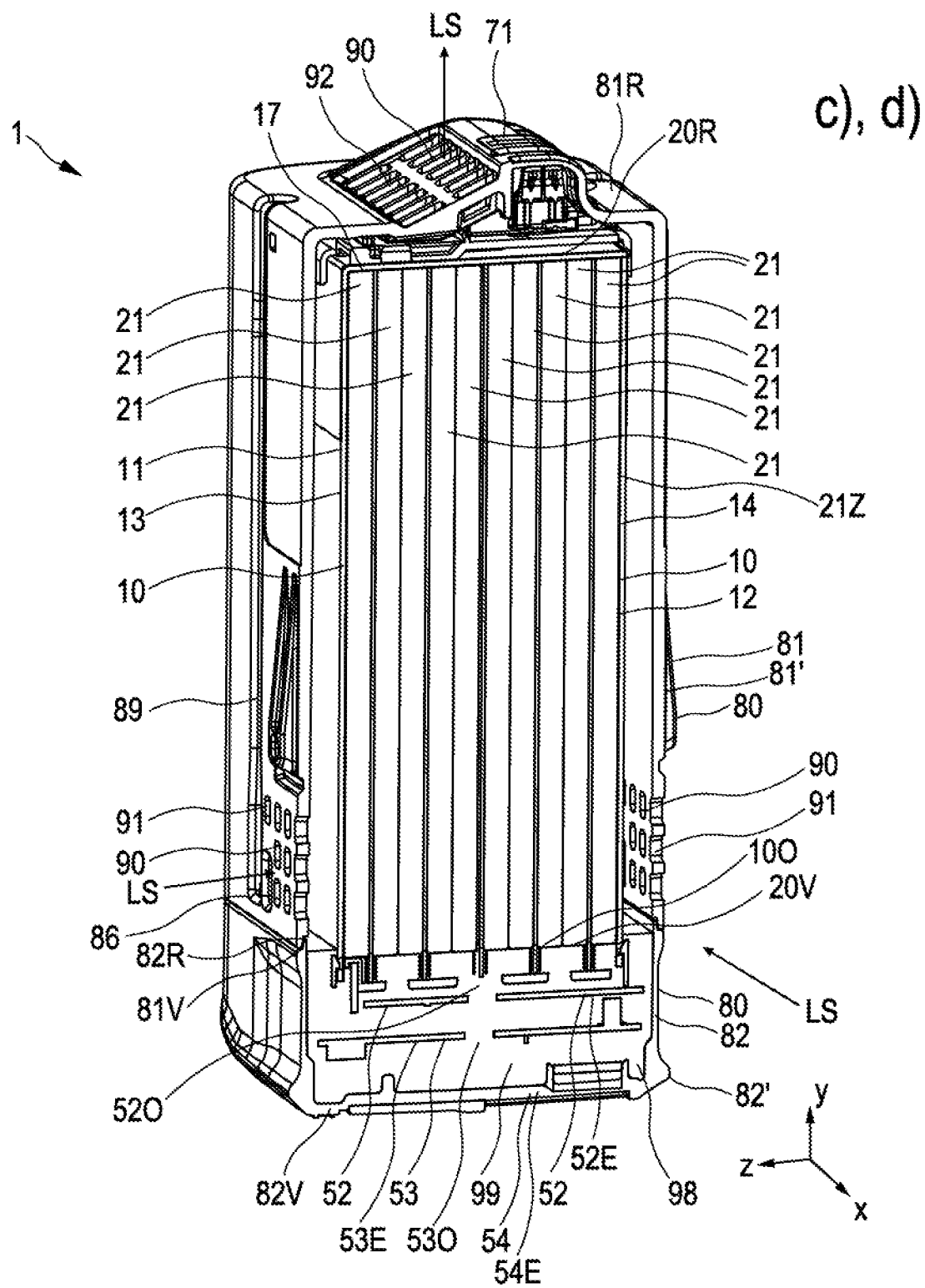
FIG. 13 shows a sectional view of the accumulator cells, the circuit board, the further circuit board, the yet another further circuit board, the second battery pack housing part and a first battery pack housing part of the battery pack housing of the battery pack from FIG. 1 including the casting compound and the method.
Figure 14:
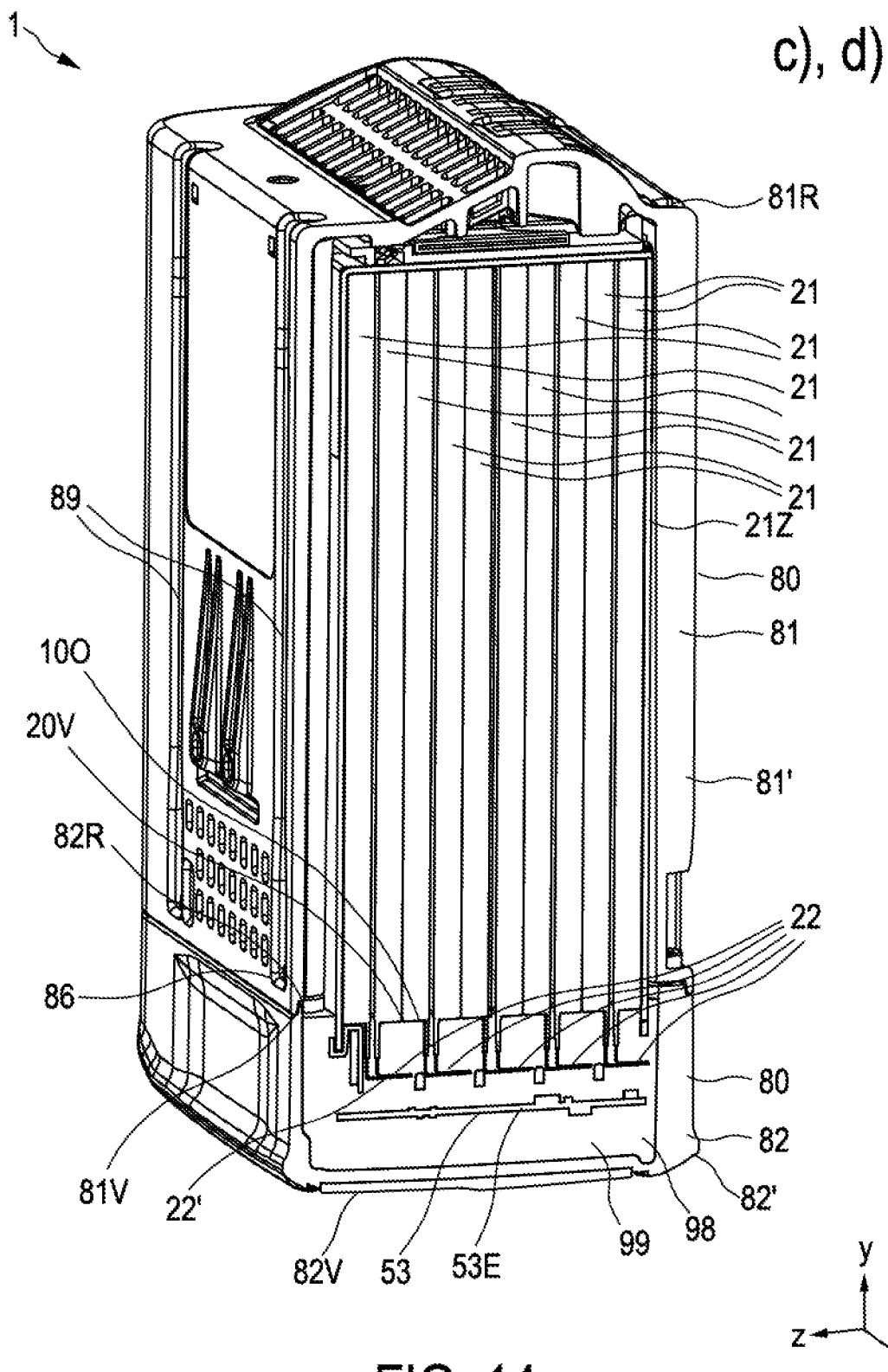
FIG. 14 shows a further sectional view of the accumulator cells, the circuit board, the further circuit board, the yet another further circuit board, the second battery pack housing part and the first battery pack housing part of the battery pack from FIG. 1 including the casting compound and the method.
Figure 15:
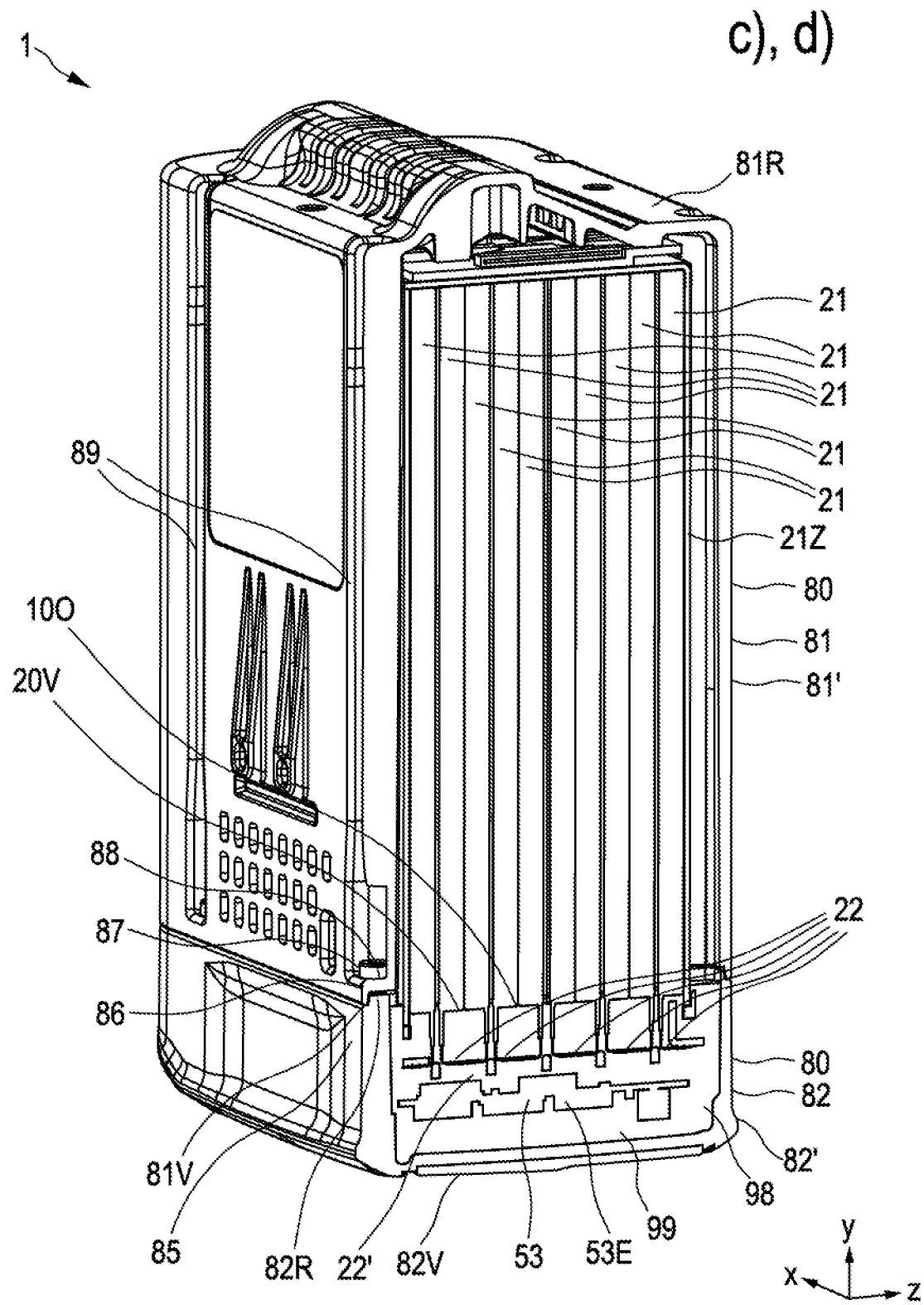
FIG. 15 shows yet another further sectional view of the accumulator cells, the circuit board, the further circuit board, the yet another further circuit board, the second battery pack housing part and the first battery pack housing part of the battery pack from FIG. 1 including the casting compound and the method.
Figure 16:
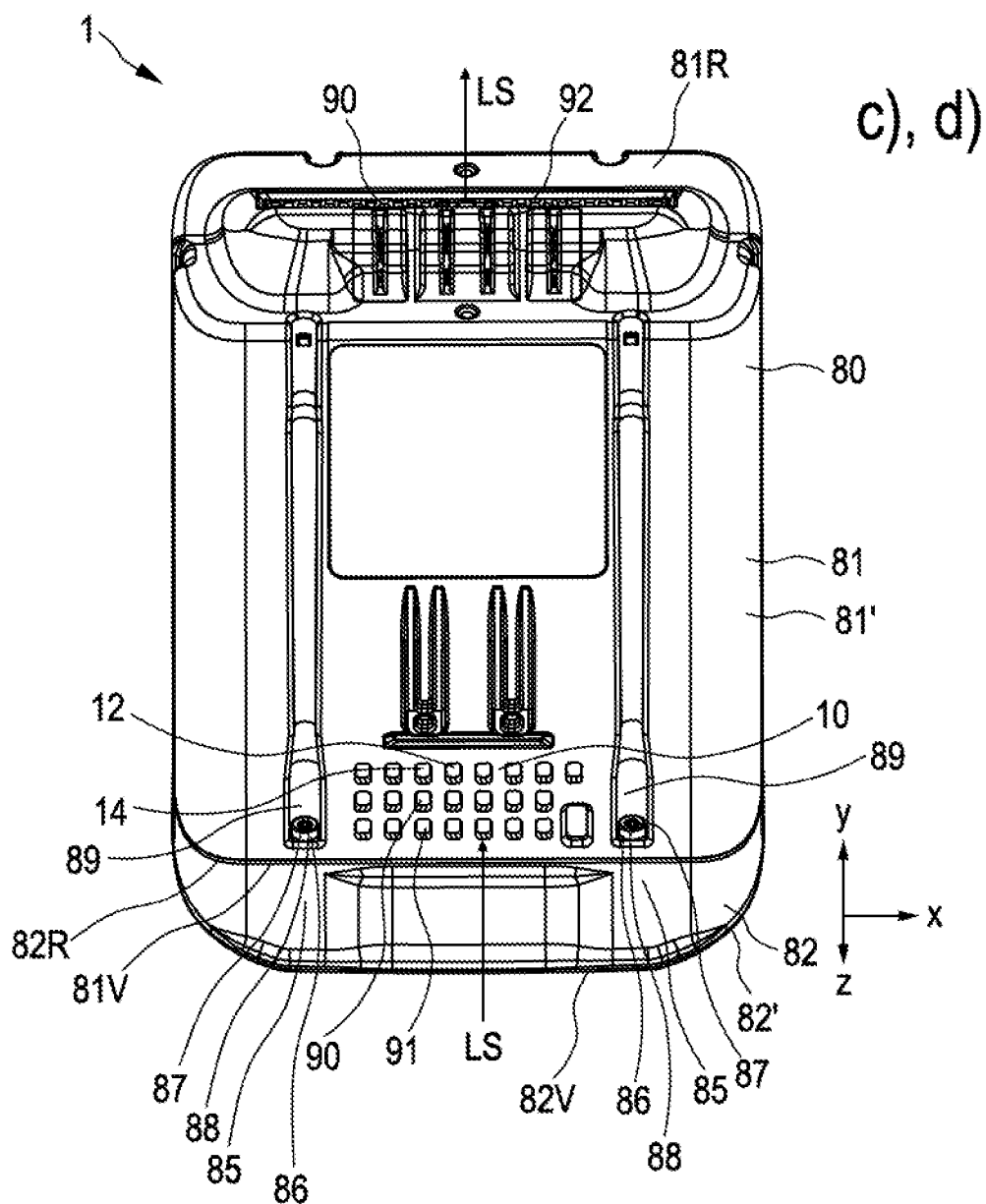
FIG. 16 shows a perspective view of the battery pack housing of the battery pack from FIG. 1.

Additionally, the cell contacts 22 and the at least one circuit board 52, 53, 54 are disposed within the second battery pack housing part 82, as illustrated in FIGS. 13 to 15. The second battery pack housing part 82 is configured as a mold for a casting compound 99. The cell contacts 22 and the at least one circuit board 52, 53, 54 are enclosed by, in particular in or within, the casting compound 99.

Figure 11:
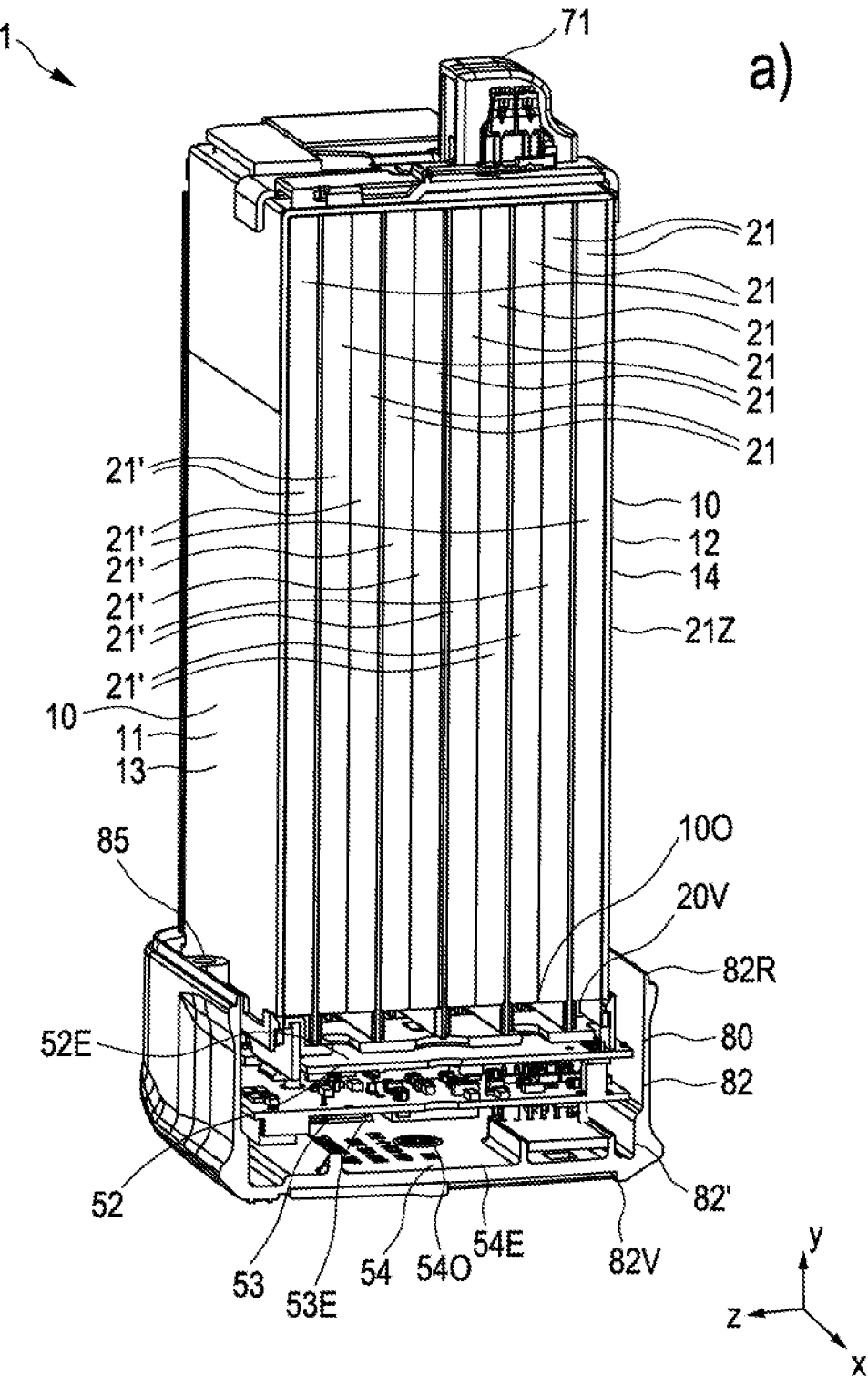
FIG. 11 shows a sectional view of the accumulator cells, the circuit board, the further circuit board, the yet another further circuit board and a second battery pack housing part of an battery pack housing of the battery pack from FIG. 1 and a method.
Figure 12:
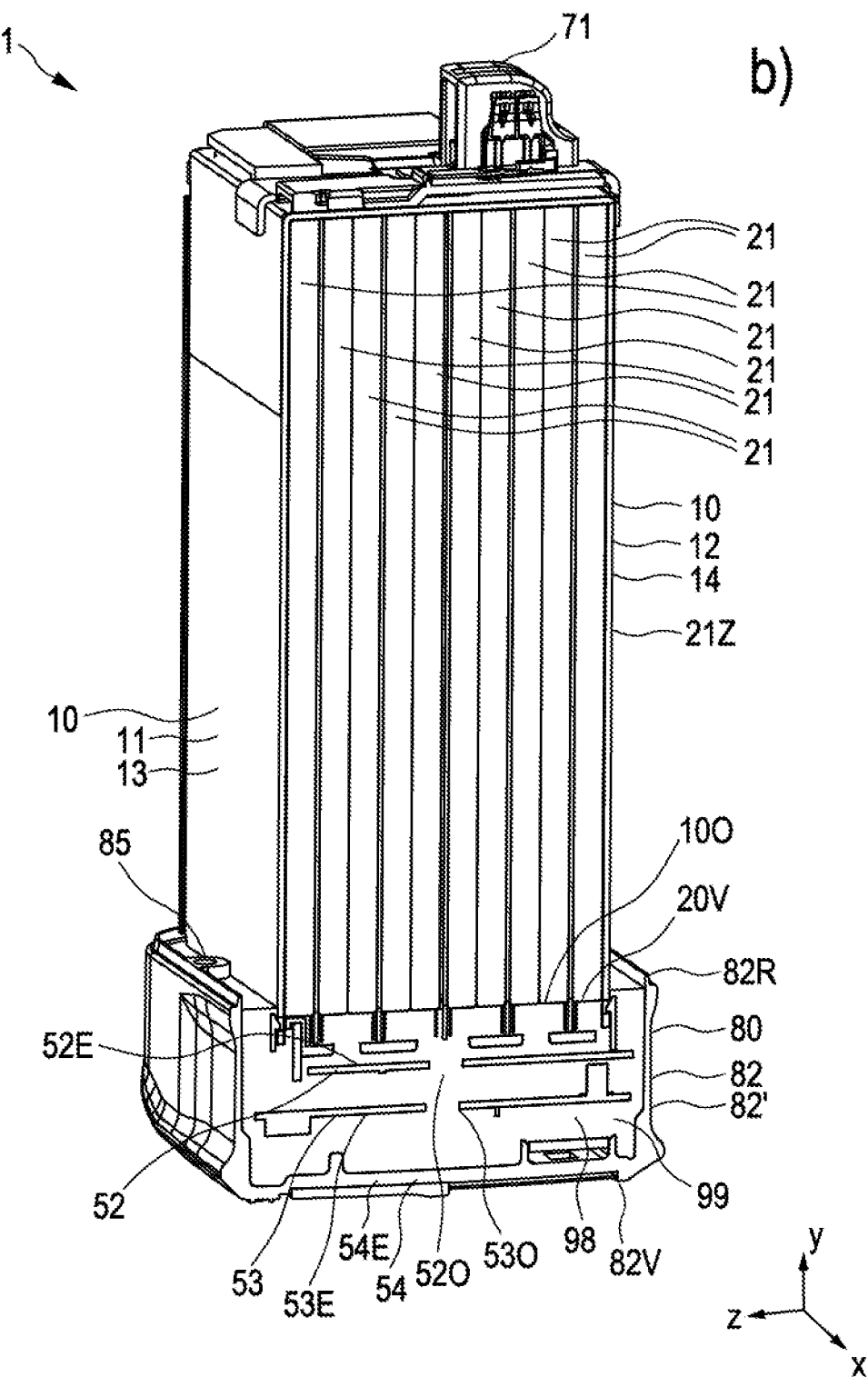
FIG. 12 shows a sectional view of the accumulator cells, the circuit board, the further circuit board, the yet another further circuit board and the second battery pack housing part of the battery pack from FIG. 1 comprising casting compound and the method.

Additionally, the at least one circuit board 52, 53, 54 is disposed within the battery pack housing 80, in particular the second battery pack housing part 82. The one battery pack housing part 82, in the exemplary embodiment shown the second battery pack housing part 82, has at least one thread 85, as illustrated in FIGS. 11 and 12. The other battery pack housing part 81, in the exemplary embodiment shown the first battery pack housing part 81, has at least one head abutment surface 86, as illustrated in FIGS. 13 to 16. The head abutment surface 86 is disposed on an end 81V of the other battery pack housing part 81 adjacent to the one battery pack housing part 82. The battery pack 1 has at least one screw 87. The screw 87 is screwed into the thread 85 for mechanical connection of the one battery pack housing part 82 and the other battery pack housing part 81 to each other, and a screw head 88 bears on the head abutment surface 86.

The method comprises the steps: a) disposing cell contacts 22 of the plurality of accumulator cells 21 and the at least one circuit board 52, 53, 54, wherein the at least one circuit board 52, 53, 54 is electrically connected to the cell contacts 22, within the second battery pack housing part 82 of the battery pack housing 80, wherein the second battery pack housing part 82 is configured as a mold for the casting compound 99, as illustrated in FIG. 11. b) enclosing the cell contacts 22 and the at least one circuit board 52, 53, 54 by the casting compound 99, as illustrated in FIG. 12. c) disposing the accumulator cells 21 within the battery pack housing 80, in particular the first battery pack housing part 81, and closing the second battery pack housing part 82 and the first battery pack housing part 81 of the battery pack housing 80 by each other, as illustrated in FIGS. 13 to 16.

In the exemplary embodiment shown, the battery pack 1 includes ten accumulator cells 21. In alternative exemplary embodiments, the battery pack can include at least two accumulator cells.

Furthermore, in the exemplary embodiment shown, the battery pack 1 includes three circuit boards 52, 53, 54. In alternative exemplary embodiments, the battery pack can include, in particular only, one, in particular single, two or at least four circuit boards.

In particular, the cell contacts 22 and the at least one circuit board 52, 53, 54 are voltaged, in particular have voltaged surfaces. The casting compound 99 is electrically insulating, and in particular heat-conducting.

Moreover, in the exemplary embodiment shown, the one battery pack housing part 82 has four threads 85, the other battery pack housing part 81 has four head abutment surfaces 86, and the battery pack 1 has four screws 87. In alternative exemplary embodiments, the battery pack housing part can have, in particular only, one, in particular single, two, three or at least five threads, the other battery pack housing part can have, in particular only, one, in particular single, two, three or at least five head abutment surfaces, and the battery pack can have, in particular only, one, in particular single, two, three or at least five screws.

Further, in alternative exemplary embodiments, the first battery pack housing part can have at least one thread, and the second battery pack housing part can have at least one head abutment surface, wherein the head abutment surface can be disposed on an end of the second battery pack housing part adjacent to the first battery pack housing part.

In particular, the one battery pack housing part 82 has at least one blind hole, wherein the blind hole has the thread 85. The other battery pack housing part 81 has a through hole, wherein the through hole has the head abutment surface 86, and the screw 87 is inserted through the through hole to the thread 85.

In addition, in the exemplary embodiment shown, in step a) and in step b), the first battery pack housing part 81 and the second battery pack housing part 82 are remote from each other or not closed by each other.

Furthermore, in the exemplary embodiment shown, step b) comprises: pouring the casting compound 99 in the second battery pack housing part 82, in particular in a liquid state.

In particular, in step b) and in step c), the second battery pack housing part 82 is oriented with an opening toward the top, as illustrated in FIGS. 12 to 17, in particular to prevent the casting compound 99 in the liquid state from flowing out of the second battery pack housing part 82.

Moreover, in the exemplary embodiment shown, step c) comprises: disposing the accumulator cells 21 within the first battery pack housing part 81.

In particular, in step c) and in time thereafter, an opening of the first battery pack housing part 81 is facing the second battery pack housing part 82 and the opening of the second battery pack housing part 82 is facing the first battery pack housing part 81. The first battery pack housing part 81 and the second battery pack housing part 82 adjoin each other or make physical contact to each other in a connecting direction y.

In addition, in the exemplary embodiment shown, the method comprises the step: screwing the screw 87 into the thread 85 until the screw 87 and the screw head 88 bears on the head abutment surface 86, for mechanical connection of the one battery pack housing part 82 and the other battery pack housing part 81 to each other, in particular in time after step c).

In particular, the thread 85 and the screw 87 extend in the connecting direction y.

In detail, the first battery pack housing part 81 is a housing container 81' and the second battery pack housing part 82 is a housing cover 82'.

In the exemplary embodiment shown, the accumulator cells 21 have cell shells 21Z.

In particular, the cell contacts 22 and the cell shells 21Z, in particular in each case, are electrically insulated from each other.

The cell shells 21Z are disposed within the housing container 82'.

Furthermore, the casting compound 99, in particular a filling level or a casting level of the casting compound 99, reaches at least up to the cell shells 21Z, in particular upwards and/or in the connecting direction y, as illustrated in FIGS. 12 to 15 and 17.

Figure 17:
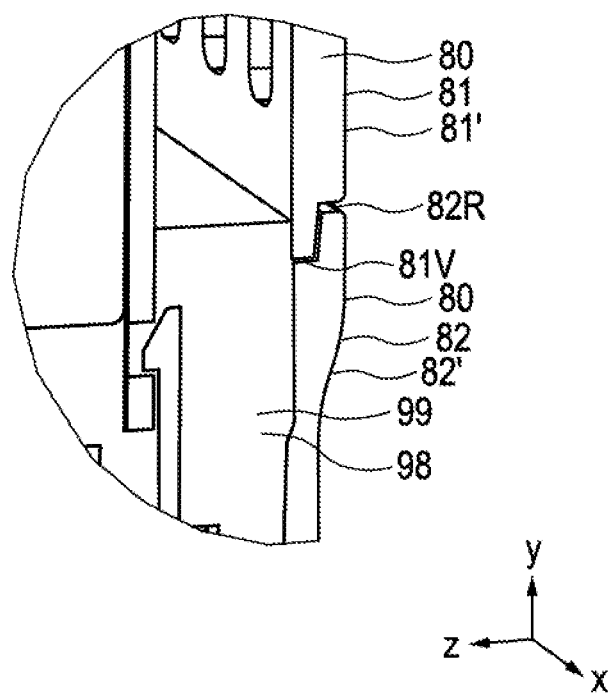
FIG. 17 shows an alternative arrangement of the first battery pack housing part and the second battery pack housing part of the battery pack from FIG. 1.

Additionally, in FIG. 17, the casting compound 99, in particular the filling level of the casting compound 99, reaches up to an end 82R of the second battery pack housing part 82 adjacent to the first battery pack housing part 81, in particular upwards and/or in the connecting direction y.

Additionally, in FIG. 17, the casting compound 99, in particular the filling level of the casting compound 99, reaches at least up to the adjacent end 81V of first battery pack housing part 81, in particular upwards and/or in the connecting direction y.

In detail, the first battery pack housing part 81 outside covers the second battery pack housing part 82 inside, in FIG. 13 to FIG. 16.

In FIG. 17, the second battery pack housing part 82 outside covers the first battery pack housing part 81 inside. Thereby, the casting compound 99 is disposed between the second battery pack housing part 82 and the first battery pack housing part 81. Thus, the casting compound 99 seals the battery pack housing 80, in particular a joint area or interface between the first battery pack housing part 81 and the second battery pack housing part 82, and connects the first battery pack housing part 81 and the second battery pack housing part 82 mechanically to each other.

Moreover, the step c) comprises: disposing and closing while the casting compound 99 is in a liquid state. The method comprises the step: d) hardening the casting compound 99 to a solid state.

In particular, in the step d), the second battery pack housing part 82 is oriented with the opening toward the top, as illustrated in FIGS. 12 to 17, in particular to prevent the casting compound 99 in the liquid state from flowing out of the second battery pack housing part 82.

In detail, in FIG. 17 in the step c), the first battery pack housing part 81 with the adjacent end 81V plunges into the casting compound 99 in the liquid state, in particular downwards and/or counter to the connecting direction y.

Further, the cell contacts 22 and the at least one circuit board 52, 53, 54 are enclosed by, in particular in or within, the casting compound 99 in a common casting block 98.

Figure 5:
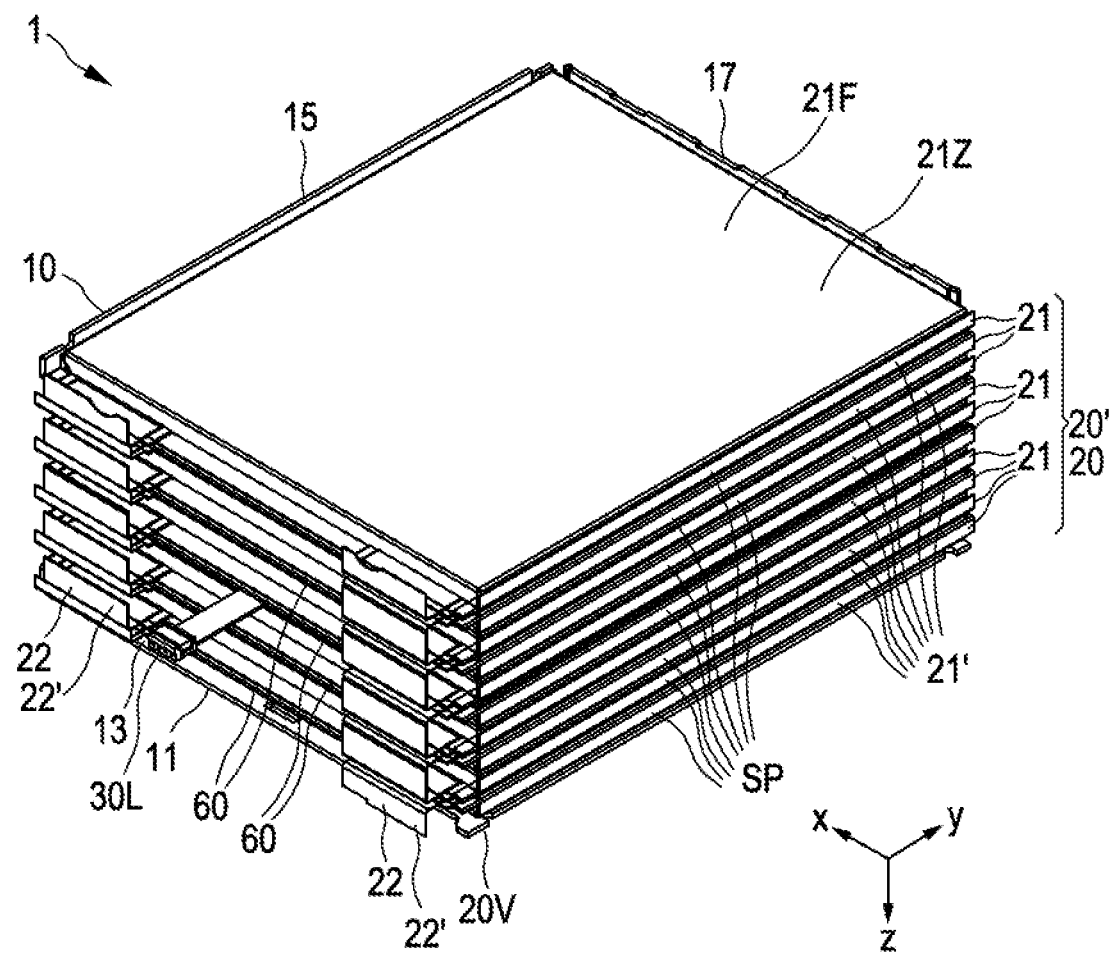
FIG. 5 shows a perspective view of the first stack housing part, of accumulator cells, the pressure sensor and the inner temperature sensor disposed in a stack of the battery pack from FIG. 1.

Additionally, the accumulator cells 21 are configured and disposed in a cell block 20, in particular in a stack 20', such that the cell contacts 22 are disposed on a common contact side, in particular front side, 20V of the cell block 20, as illustrated in FIG. 5.

In the exemplary embodiment shown, the cell block 20 with the contact side 20V ahead, in particular counter to the connecting direction y, is disposed within the second battery pack housing part 82 and/or the contact side 20V is orthogonal to the connecting direction y, as illustrated in FIGS. 11 to 15.

In detail, the at least one circuit board 52, 53, 54 is disposed on the contact side, in particular front side, 20V, in particular with a board plane 52E, 53E, 54E parallel to the contact side 20V, as illustrated in FIGS. 7, 8 and 11 to 15.

Furthermore, the accumulator cells 21 are pouch cells 21' and the cell contacts 22 are cell tabs 22'.

In the exemplary embodiment shown, the pouch cells 21' are disposed in the stack 20' in a stack direction z which is, in particular, orthogonal to the connecting direction.

Furthermore, in the exemplary embodiment shown, the cell tabs 22', in particular in each case, of next pouch cells 21' are electrically connected to each other, in particular directly, by a material-bonding engagement, in particular a welded connection. In particular, the pouch cells 21' are interconnected in series, in particular in the stack direction z.

Figure 3:
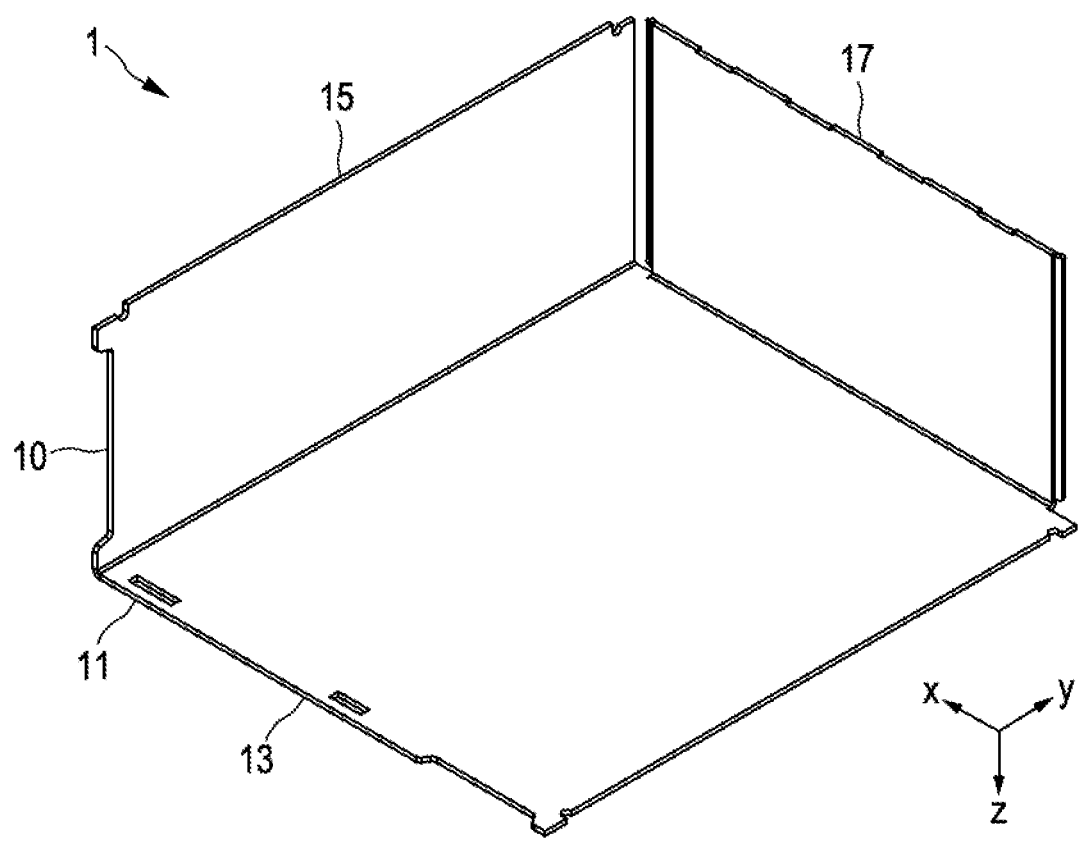
FIG. 3 shows a perspective view of a first stack housing part of a stack housing of the battery pack from FIG. 1.
Figure 6:
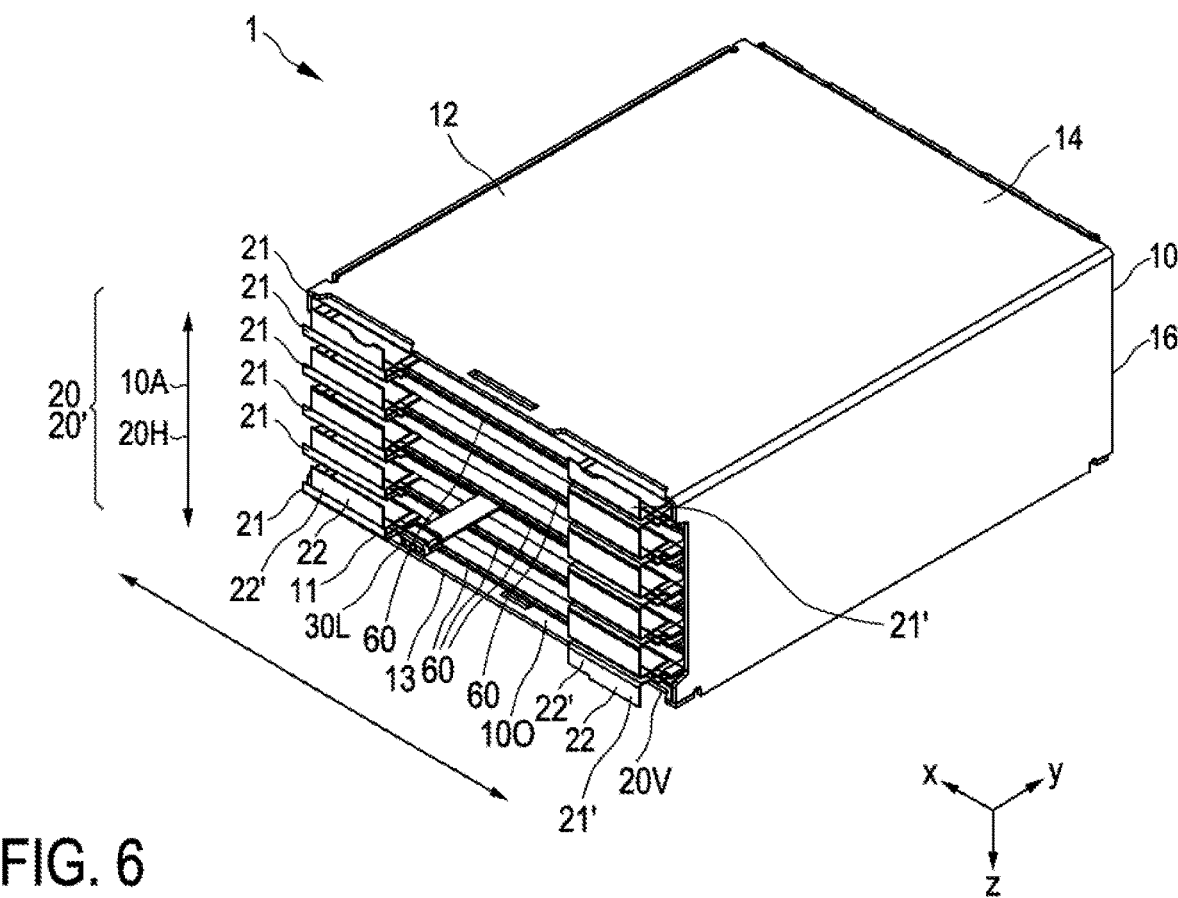
FIG. 6 shows a perspective view of the first stack housing part, the stack and a second stack housing part of the stack housing of the battery pack from FIG. 1.

Further, in the exemplary embodiment shown, the battery pack 1 has a stack housing 10, in particular a massive stack housing. The stack housing 10 comprises a first stack housing part 11, as illustrated in FIG. 3, and a second stack housing part 12, as illustrated in FIG. 6. The stack 20' is disposed between the first stack housing part 11 and the second stack housing part 12. The first stack housing part 11 and the second stack housing part 12 are mechanically connected, in particular directly, connected to each other, by at least one material-bonding engagement, in particular a welded connection, as illustrated in FIG. 7.

In detail, the first stack housing part 11 has a first stack housing wall 13. The second stack housing part 12 has a second stack housing wall 14. The second stack housing wall 14 is disposed opposite and with a distance 10A, in particular with a fixed distance 10A, to the first stack housing wall 13, in particular in the stack direction z, as illustrated in FIG. 6. The stack 20' is disposed between the first stack housing wall 13 and the second stack housing wall 14. A height 20H of the stack 20', in particular in the stack direction z, is limited by the first stack wall 13 and the second stack housing wall 14, in particular their distance 10A.

Moreover, the stack housing 10 is cuboid in shape and has at least four, in the exemplary embodiment shown five, stack housing walls 13, 14, 15, 16, 17. The first stack housing part 11 has the first stack housing wall or upper side wall 13, the stack housing wall, in particular peripheral side wall, 15 and the stack housing wall, in particular rear side wall, 17. The second stack housing part 12 has the second stack housing wall or bottom side wall 14 and the stack housing wall, in particular peripheral side wall, 16.

Furthermore, the stack housing 10 has a common stack housing opening 100, in particular defined by the stack housing walls 13, 14, 15, 16. The pouch cells 21' are configured and disposed in the stack 20' within the stack housing 10 such that the cell tabs 22' are disposed on the common contact side, in particular front side, 20V of the stack 20' on the common stack housing opening 100.

In particular, the stack housing 10 is disposed within the battery pack housing 80, and in particular an inner housing or not accessible from the outside. Moreover, the casting compound 99, in particular a filling level or a casting level of the casting compound 99, reaches at least up to the stack housing 10, in particular upwards and/or in the connecting direction y, as illustrated in FIGS. 12 to 15 and 17. Further, the stack housing 10 is not gas-tight, in particular to allow that gas can escape from the stack housing 10. Additionally, the stack housing 10, in particular the stack housing walls 13, 14, 15, 16, 17 are electrically insulated from the pouch cells 21'.

Figure 8:
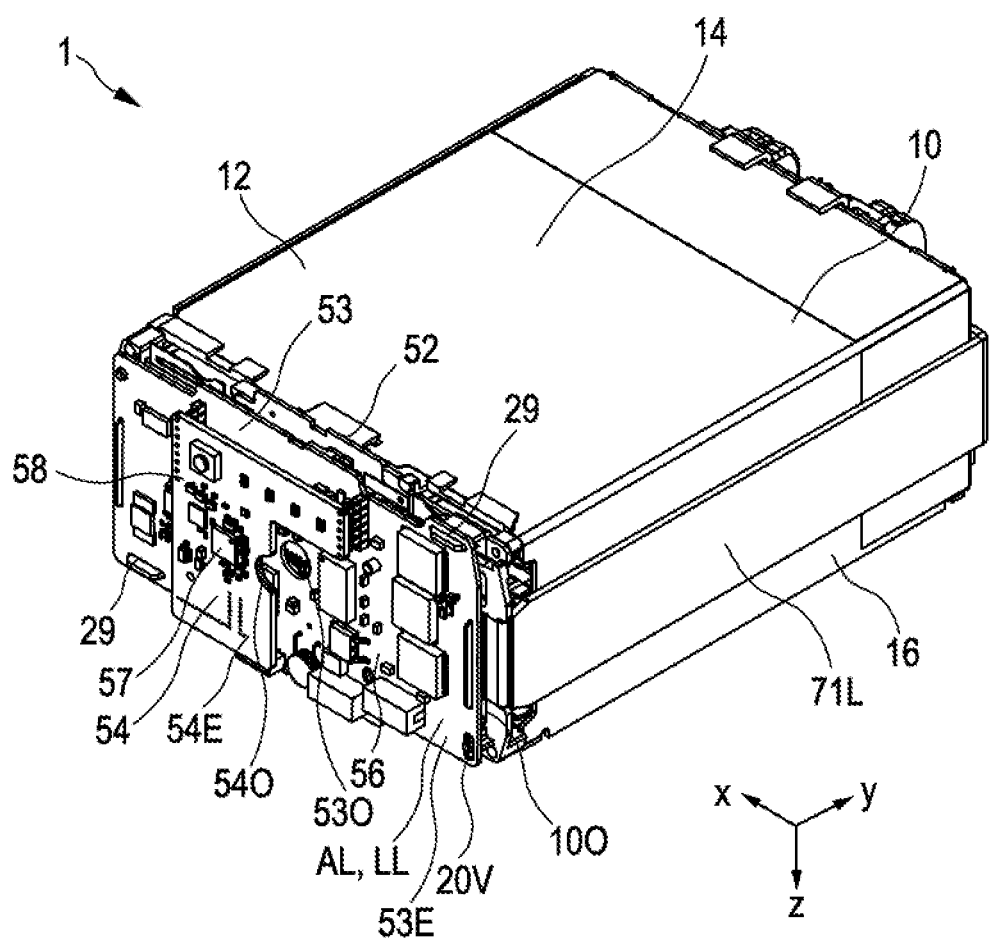
FIG. 8 shows a perspective view of the first stack housing part, the stack, the second stack housing part, the circuit board, a further circuit board and yet another further circuit board of the battery pack from FIG. 1.

Furthermore, in the exemplary embodiment shown, the battery pack 1 has at least one electrical power connector 29, in the exemplary embodiment shown two power connectors 29, as illustrated in FIG. 8. The electrical power connector 29 is electrically connected, in particular directly connected, to one of the cell tabs 22' by a material-bonding engagement, in particular a welded connection.

In particular, the at least one electrical power connector 29 is voltaged, in particular has a voltaged surface. Moreover, the at least one electrical power connector 29 is disposed within the second battery pack housing part 82. Further, the at least one electrical power connector 29 is enclosed by, in particular in or within, the casting compound 99.

Additionally, the circuit board 52 holds measurement electronics 55, as illustrated in FIG. 7. The measurement electronics 55 are configured for measuring properties, in particular voltages SP, of the accumulator cells 22.

In the exemplary embodiment shown, the circuit board 52, in particular the measurement electronics 55, are electrically connected to a number of the cell contacts 22, in particular cell tabs 22', by means of electrical cell connectors 52eV.

In particular, the electrical cell connectors 52eV are voltaged, in particular have voltaged surfaces. Furthermore, the electrical cell connectors 52eV are disposed within the second battery pack housing part 82. Moreover, the electrical cell connectors 52eV are enclosed by, in particular in or within, the casting compound 99.

Additionally, the circuit board 53, in particular the further circuit board 53, holds power electronics 56, as illustrated in FIG. 8. The power electronics 56 are configured for controlling the output of the electric driving power AL from the battery pack 1 and/or an input of electric charging power LL to the battery pack 1, in particular in response to the measured properties.

In the exemplary embodiment shown, the further circuit board 53 is disposed farther remote from the cell block 20, in particular stack 20', than the circuit board 52.

Further, in the exemplary embodiment shown, the further circuit board 53, in particular the power electronics 56, is/are electrically connected to the circuit board 52, in particular the measurement electronics 55.

Additionally, in the exemplary embodiment shown, the further circuit board 53, in particular the power electronics 56, is/are electrically connected to the at least one electrical power connector 29.

In addition, the circuit board 54, in particular the yet another further circuit board 54, holds user interface electronics 57 and transmission electronics 58. The interface electronics 57 are configured for interaction with a user. The transmission electronics 58 are configured for wireless transmission of at least one operating parameter and/or operating condition.

In the exemplary embodiment shown, the yet another further circuit board 54 is disposed farther remote from the cell block 20, in particular stack 20', than the further circuit board 53, and in particular than the further circuit board 52, in particular on an end 82V of the second battery pack housing part 82 remote from the first battery pack housing part 81, as illustrated in FIGS. 11 to 15.

Furthermore, in the exemplary embodiment shown, the user interface electronics 57 are configured for output, in particular display, a charging condition of the battery pack 1.

Moreover, in the exemplary embodiment shown, the yet another further circuit board 54, in particular the interface electronics 57 and the transmission electronics 58, is/are electrically connected to the circuit board 52, in particular the measurement electronics 55, and/or the further circuit board 53, in particular the power electronics 56.

Further, in the exemplary embodiment shown, the at least one circuit board 52, 53, 54 has a recess 520, 530, 540, in particular a through hole. The recess 520, 530, 540 is configured for passing a sensor line 30L, for a flow of casting compound 99 and/or for positioning of the at least one circuit board 52, 53, 54, in particular the circuit boards 52, 53, 54, in relation to each other.

Figure 4:
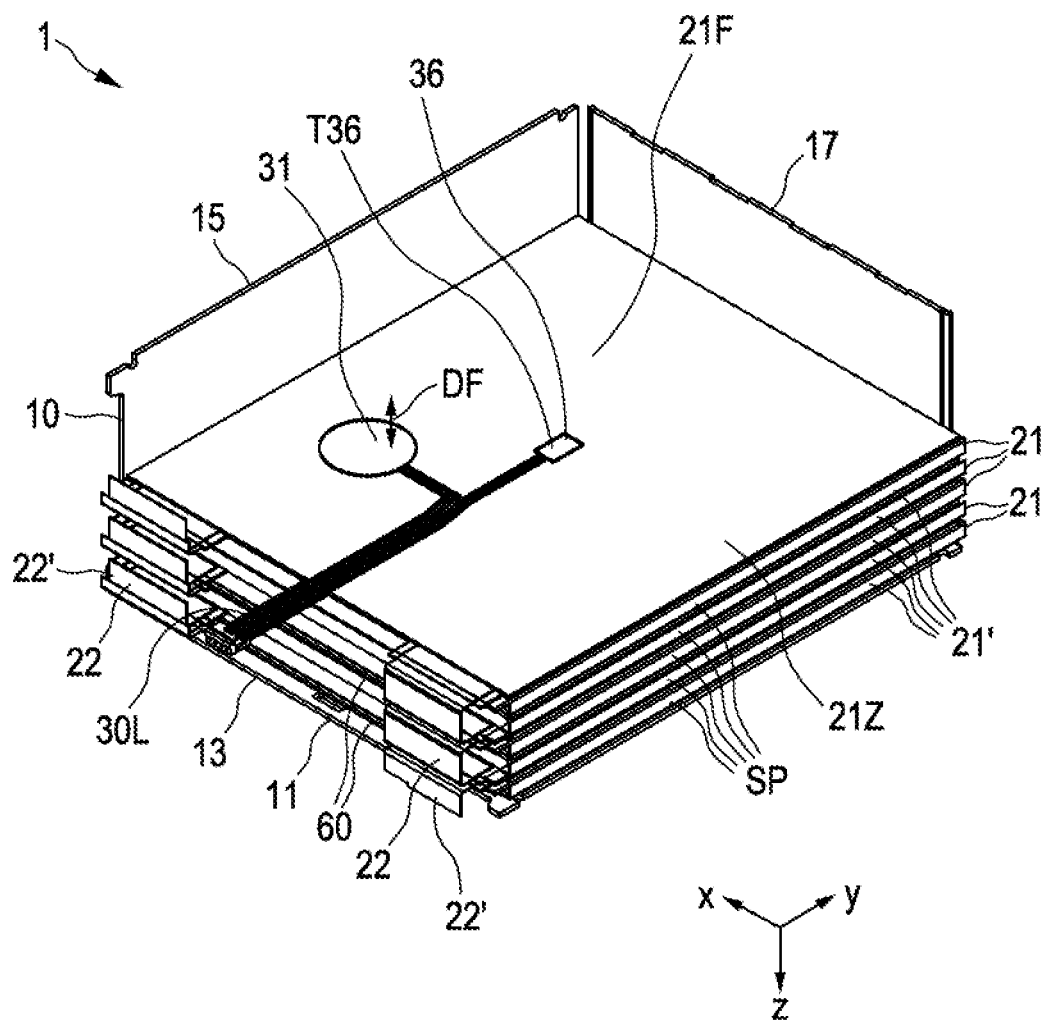
FIG. 4 shows a perspective view of the first stack housing part, of accumulator cells, a pressure sensor and an inner temperature sensor of the battery pack from FIG. 1.

Additionally, in the exemplary embodiment shown, the battery pack 1 has a pressure sensor 31, as illustrated in FIG. 4. The pressure sensor 31 is configured for detecting, in particular measuring, a pressure force DF acting on the pouch cells 21', in particular in the stack direction z. Furthermore, the battery pack 1 has an inner temperature sensor 36. The inner temperature sensor 36 is configured for measuring an inner temperature T36 of the stack 20'. The sensor line 30L is from the pressure sensor 31 and the inner temperature sensor 36. The circuit board 52, in particular the measurement electronics 55, is/are electrically connected to the pressure sensor 31 and the inner temperature sensor 36 via the sensor line 30L.

In particular, the sensor line 30L is electrically insulated, with the exception of one end on the circuit board 52. The circuit board-sided end of the sensor line 30L is disposed within the second battery pack housing part 82. Moreover, the circuit board-sided end of the sensor line 30L is enclosed by, in particular in or within, the casting compound 99.

Figure 9:
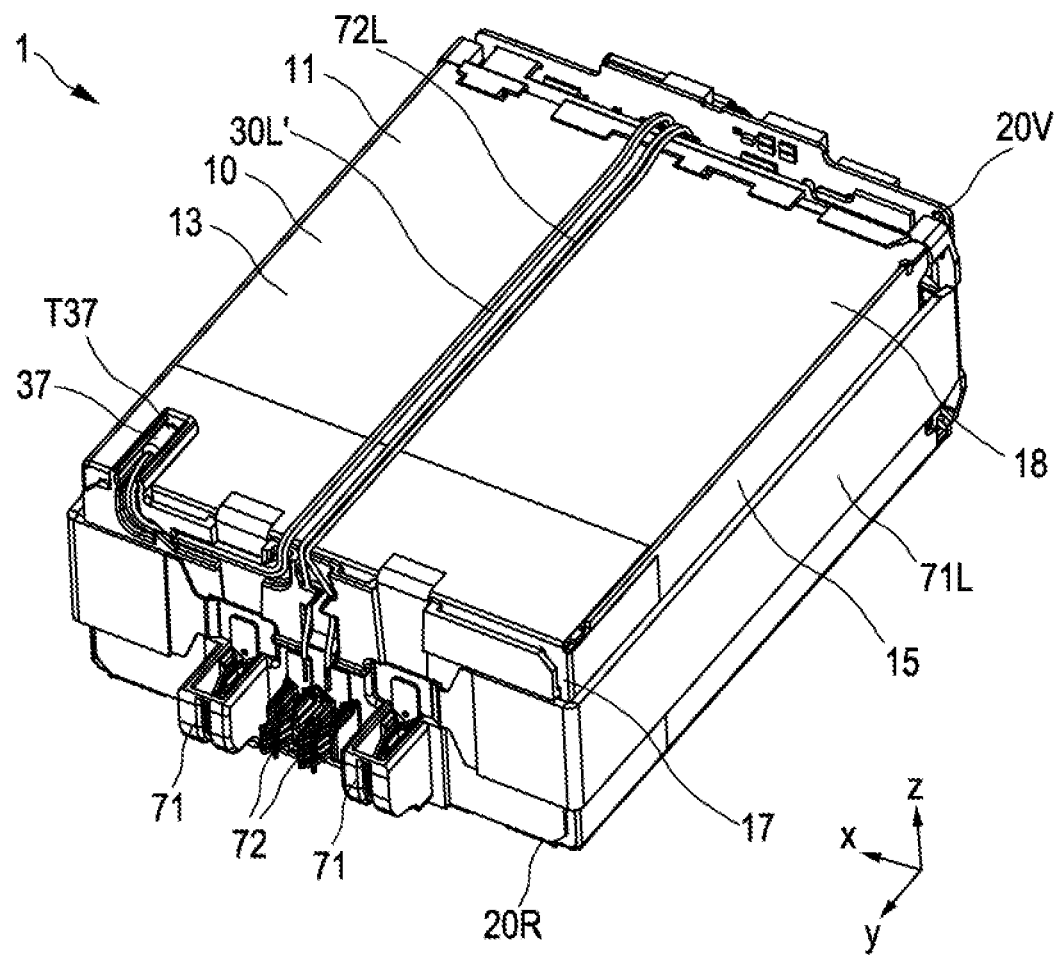
FIG. 9 shows a perspective view of a rear side of the first stack housing part, the stack, the second stack housing part, the circuit board, the further circuit board, the yet another further circuit board and an outer temperature sensor of the battery pack from FIG. 1.
Figure 10:
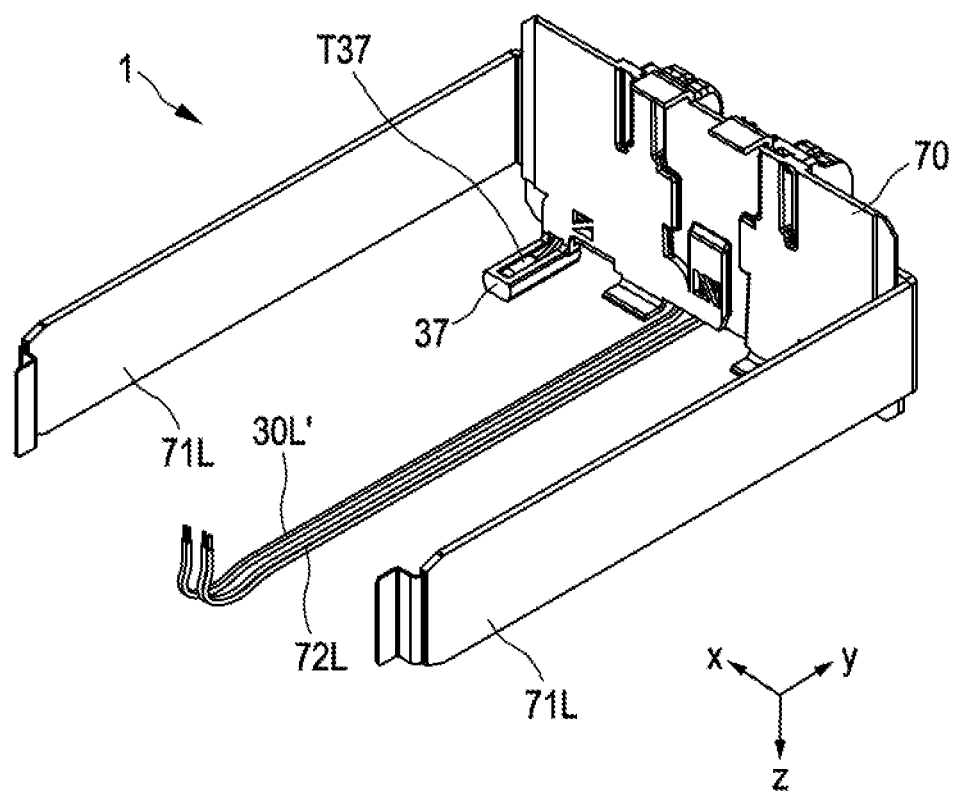
FIG. 10 shows a perspective view of the outer temperature sensor of the battery pack from FIG. 1.

Further, in the exemplary embodiment shown, the battery pack 1 has an outer temperature sensor 37, as illustrated in FIGS. 9 and 10. The outer temperature sensor 37 is configured for measuring an outer temperature T37 of the stack 20'. The circuit board 52, in particular the measurement electronics 55, is/are electrically connected to the outer temperature sensor 37 via a further sensor line 30L'.

In particular, the further sensor line 30L' is electrically insulated, with the exception of one end on the circuit board 52. The circuit board-sided end of the further sensor line 30L' is disposed within the second battery pack housing part 82. Moreover, the circuit board-sided end of the further sensor line 30L' is enclosed by, in particular in or within, the casting compound 99.

Furthermore, in the exemplary embodiment shown, the power electronics 56 are configured for controlling the output of the electric driving power AL from the battery pack 1 and/or the input of charging power LL to the battery pack 1 in response to the detected, in particular measured, pressure force DF, the measured inner temperature T36 and the measured outer temperature T37.

Moreover, the battery pack 1 has a plurality of battery pack contacts 71, as illustrated in FIG. 9. The battery pack contacts 71 are configured for electrical connection of the battery pack 1 and the treatment apparatus 101 together for supplying the treatment apparatus 101 with the electric driving power AL from the battery pack 1. Further, the battery pack contacts 71 are disposed on an end 81R of the first battery pack housing part 81 remote from the second battery pack housing part 82.

In the exemplary embodiment shown, the battery pack contacts 71 are disposed on a rear side 20R of the cell block 20 opposite the contact side, in particular front side, 20V of the cell block 20, in particular on the stack housing 10, in particular on the stack housing wall or rear side wall 17.

Additionally, in the exemplary embodiment shown, the further circuit board 53, in particular the power electronics 56, are electrically connected to the battery pack contacts 71 via power lines 71L.

In particular, the power lines 71L are power rails, in particular metallic punch-bended elements which are, in particular in each case, covered by a shrinking tube for electrical insulation. In other words: the power lines 71L are electrically insulated, with the exception of one end, in particular the respective end, on the further circuit board 53 and on the battery pack contacts 71. The circuit board-sided end of the power line 71L is disposed within the second battery pack housing part 82. Moreover, the circuit board-sided end of the power line 71L is enclosed by, in particular in or within, the casting compound 99.

Moreover, the battery pack 1 has a plurality of data contacts 72, as illustrated in FIG. 9. The data contacts 72 are disposed on the remote end 81R of the first battery pack housing part 81.

In the exemplary embodiment shown, the data contacts 72 are disposed on the rear side 20R of the cell block 20, in particular on the stack housing 10, in particular on the stack housing wall or rear side wall 17.

Further, in the exemplary embodiment shown, the circuit board 52, in particular the measurement electronics 55, is/are electrically connected to the data contacts 72 via a data line 72L.

In particular, the data line 72L is electrically insulated, with the exception of one end, in particular the respective end, on the circuit board 52 and on the data contacts 72. The circuit board-sided end of the data line 72L is disposed within the second battery pack housing part 82. Moreover, the circuit board-sided end of the data line 72L is enclosed by, in particular in or within, the casting compound 99.

Thereby, all voltaged components, in particular voltaged surfaces, within the second battery pack housing part 82 or not on the remote end 81R of the first battery pack housing part 81, are enclosed by, in particular in or within, the casting compound 99.

Furthermore, the other battery pack housing part 81, in the exemplary embodiment shown the first battery pack housing part 81, has at least one groove 89, in particular for guiding the battery pack 1 in mechanical connection to the treatment apparatus 101, as illustrated in FIGS. 13 to 16. The groove 89 extends on the head abutment surface 86 in prolongation of the thread 85, in particular in the connecting direction y.

In the exemplary embodiment shown, the other battery pack housing part 81 has four grooves 89. In alternative exemplary embodiments, the other battery pack housing part can have only one, in particular a single, two, three or at least five grooves. In addition or as an alternative, in alternative exemplary embodiments, the second battery pack housing part can have the at least one groove.

Moreover, the first battery pack housing part 81 has a number of air openings 91, in particular a number of air inlet openings, as illustrated in FIGS. 13 to 16. The number of air openings 91 is disposed on the adjacent end 81V of the first battery pack housing part 81, in particular between two grooves 89.

In the exemplary embodiment shown, the battery pack 1, in particular the first battery pack housing part 81, has at least one air cooling circuit 90 including the number of air inlet openings 91 and a number of air outlet openings 92 in the battery pack housing 80, in particular the first battery pack housing part 81, for a cooling air flow LS passing from the number of air inlet openings 91 on the accumulator cells 21, in particular the stack housing 10, to the number of air outlet openings 92 for cooling the accumulator cells 21.

In particular, the number of air outlet openings 92 is disposed on the remote end 81R of the first battery pack housing part 81.

Further, the outer temperature sensor 37 is disposed in the air cooling circuit 90 between the number of air inlet openings 91 and the number of air outlet openings 92, in particular facing the number of air inlet openings 91 and/or the number of air outlet openings 92.

Additionally, in the exemplary embodiment shown, the stack housing 10 has a thermal connection to the accumulator cells 21, in particular the pouch cells 21', and is thermally conductive. This allows heat dissipation from the accumulator cells 21 via the stack housing 10 and/or the casting compound 99 to the outside, in particular downwards and/or counter the connecting direction y. In particular this allows heat dissipation from the stack housing 10 to the casting compound 99, in particular from the accumulator cells 21 via the stack housing 10 and the casting compound 99 to the outside.

In particular, the stack housing 10 makes physical contact, in particular the housing walls 13, 14, 15, 16, 17 make physical contact, to the pouch cells 21', and heat-conducting paste is provided between the pouch cells 21' and the housing walls 15, 16, 17.

Furthermore, in the exemplary embodiment shown, the battery pack 1 has at least one thermal insulation 60, in particular a foamed material, as illustrated in FIGS. 4 to 6. The at least one thermal insulation 60 is respectively disposed between two of the pouch cells 21' and extends across a major part of the surface 21F of the pouch cells 21.

Additionally, in the exemplary embodiment shown, the at least one thermal insulation 60 is a buffer element. The at least one buffer element 60 is configured to buffer inflating, where present, of the pouch cells 21', in particular in the stack direction z, across a buffer thickness 60D of the at least one buffer element 60.

In the exemplary embodiment shown, the battery pack 1 has five thermal insulations 60. In alternative exemplary embodiments, the battery pack 1 can have only a single thermal insulation.

Moreover, in the exemplary embodiment shown, the battery pack 1 has a maximum electric driving power MAL of 3 kW. In alternative exemplary embodiments, the battery pack can have a maximum electric driving power of a minimum of 1 kW and/or a maximum of 10 kW.

In addition, in the exemplary embodiment shown, the battery pack 1 has a nominal voltage NSP of 36 V. In alternative exemplary embodiments, the battery pack can have a nominal voltage of a minimum of 10 V and/or a maximum of 100 V.

In addition, in the exemplary embodiment shown, the battery pack 1 has a maximum energy content MEI of 337 Wh. In alternative exemplary embodiments, the battery pack can have a maximum energy content of a minimum of 100 Wh and/or a maximum of 1000 Wh.

In addition, in the exemplary embodiment shown, the battery pack 1 has a mass ml of 2 kg. In alternative exemplary embodiments, the battery pack can have a mass of a minimum of 0.5 kg and/or a maximum of 10 kg.

In addition, in the exemplary embodiment shown, the battery pack 1 has a height 1H, in particular in the stack direction z, of 5 cm, a width 1B, in particular in a direction x orthogonal to the stack direction z and/or the connecting direction y, of 10 cm, and a depth 1T, in particular in the connecting direction y, of 15 cm. In alternative exemplary embodiments, the battery pack can have a height of a minimum of 2.5 cm and/or of a maximum of 10 cm, and/or a width of a minimum of 5 cm and/or of a maximum of 20 cm, and/or a depth of a minimum of 7.5 cm and/or of a maximum of 30 cm.

Figure 1:
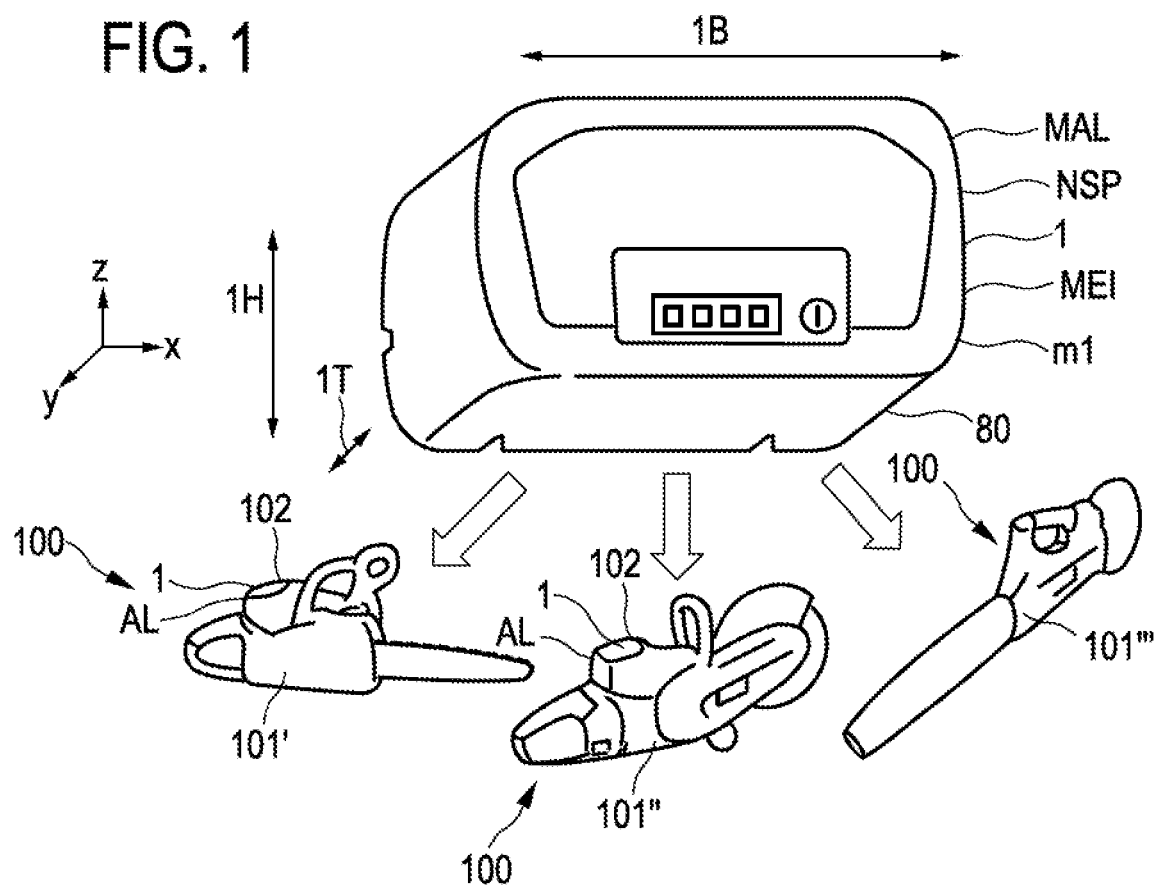
FIG. 1 shows a perspective view of a treatment system including a battery pack and an electrically driven treatment apparatus in the form of a saw, a cutoff grinder and a blower device.
Figure 2:
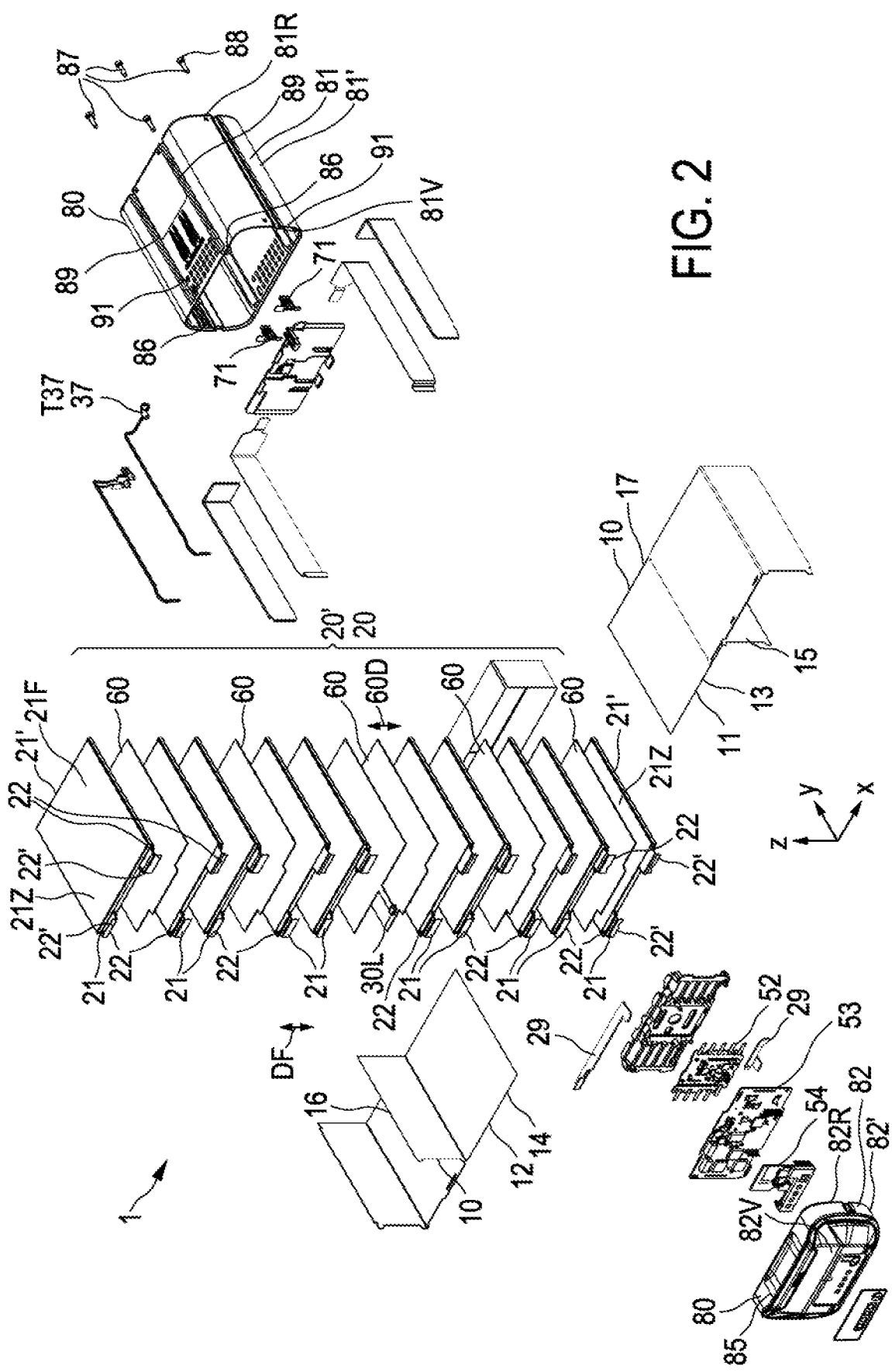
FIG. 2 shows an exploded view of the battery pack from FIG. 1.

FIG. 1 shows a treatment system 100 according to the invention. The treatment system 100 comprises the battery pack 1 and an electrically driven treatment apparatus 101. The battery pack 1 and the treatment apparatus 101 are configured for electrical connection to each other for supplying the treatment apparatus 101 with an electric driving power AL from the battery pack 1, in particular are electrically connected.

In detail, the treatment apparatus 101 includes a battery accommodation 102. The battery accommodation 102 is configured for accommodating the battery pack 1. In particular, the battery pack 1 is accommodated.

In FIG. 1, the electrically driven treatment apparatus 101 is a saw 101', a cutoff grinder 101", or a blower device 101'''. In alternative exemplary embodiments, the treatment apparatus can be a pole pruner, a clearing saw, a brush cutter, hedge shears, a hedge cutter, a leaf blower, a lopper, a cutoff grinder, a sweeper device, a sweeper roller, a sweeper brush, a lawn mower, a dethatcher, or a grass trimmer.

As is made clear by the exemplary embodiments illustrated and described above, the invention provides a battery pack for supplying an electrically driven treatment apparatus with an electric driving power, a treatment system comprising such a battery pack and an electrically driven treatment apparatus, and a method for the production of a battery pack for supplying an electrically driven treatment apparatus with an electric driving power, wherein both the battery pack and the method each have improved properties.

What is claimed is:

1. A battery pack for supplying an electrically driven treatment apparatus with an electric driving power, the battery pack comprising:
   a plurality of accumulator cells having cell contacts;
   at least one circuit board electrically connected to the cell contacts; and
   a battery pack housing, wherein
      the battery pack housing has a first battery pack housing part and a second battery pack housing part,
      the first battery pack housing part and the second battery pack housing part are closed by each other,
      the accumulator cells are disposed within the battery pack housing,
      the cell contacts and the at least one circuit board are disposed within the second battery pack housing part, and
      the battery pack housing is configured to protect the accumulator cells and the at least one circuit board from physical contact wherein
         the second battery pack housing part is configured as a mold for a casting compound,
         the cell contacts and the at least one circuit board are enclosed by the casting compound,
         the accumulator cells have cell shells,
         the casting compound reaches at least up to the cell shells,
         the accumulator cells are pouch cells,
         the cell contacts are cell tabs, and
         the cell shells are partially not enclosed by the casting compound to allow gas to escape from the cell shells.

2. The battery pack according to claim 1, wherein
   the first battery pack housing part is a housing container, and
   the second battery pack housing part is a housing cover.

3. The battery pack according to claim 1, wherein at least one of:
   the casting compound reaches up to an end adjacent to the first battery pack housing part of the second battery pack housing part, or
   the casting compound reaches at least up to an end adjacent to the second battery pack housing part of the first battery pack housing part.

4. The battery pack according to claim 1, wherein
   the cell contacts and the at least one circuit board are enclosed by the casting compound in a common casting block.

5. The battery pack according to claim 1, wherein
   the accumulator cells are configured and disposed in a cell block such that the cell contacts are disposed on a common contact side of the cell block.

6. The battery pack according to claim 5, wherein
   the at least one circuit board is disposed on the contact side.

7. The battery pack according to claim 1, wherein at least one of:
   the at least one circuit board holds measurement electronics, wherein
      the measurement electronics are configured for measuring properties of the accumulator cells,
   the at least one circuit board holds power electronics, wherein
      the power electronics are configured for controlling output of the electric driving power from the battery pack and/or an input of electric charging power to the battery pack, or
   the at least one circuit board holds user interface electronics, wherein
      the user interface electronics are configured for interaction with a user, and/or holds transmission electronics, wherein
         the transmission electronics are configured for wireless transmission of at least one operating parameter and/or operating condition.

8. The battery pack according to claim 1, the battery pack further comprising:
   a plurality of battery pack contacts, wherein
      the battery pack contacts are configured for electrical connection of the battery pack and the treatment apparatus together for supplying the treatment apparatus with the electric driving power from the battery pack and disposed on an end remote from the second battery pack housing part of the first battery pack housing part.

9. The battery pack according to claim 1, wherein
   the first battery pack housing part has a number of air openings, and
   the number of air openings are disposed on an end adjacent to the second battery pack housing part of the first battery pack housing part.

10. The battery pack according to claim 1, wherein at least one of:
    the battery pack has a maximum electric driving power of a minimum of 1 kW and/or of a maximum of 10 kW,
    the battery pack has a nominal voltage of a minimum of 10 V and/or of a maximum of 100 V, the battery pack has a maximum energy content of a minimum of 100 Wh and/or of a maximum of 1000 Wh, the battery pack has a mass of a minimum of 0.5 kg and/or of a maximum of 10 kg, or the battery pack has a height of a minimum of 2.5 cm and/or of a maximum of 10 cm, a width of a minimum of 5 cm and/or of a maximum of 20 cm, and a depth of a minimum of 7.5 cm and/or of a maximum of 30 cm.

11. A treatment system, comprising:

a battery pack according to claim 1, and an electrically driven treatment apparatus, wherein the battery pack and the treatment apparatus are configured for electrical connection with each other for supplying the treatment apparatus with electric driving power from the battery pack.

12. A method for producing the battery pack of claim 1 for supplying an electrically driven treatment apparatus with electric driving power, the method comprising the steps of:

a) disposing cell contacts of the plurality of accumulator cells and the at least one circuit board electrically connected to the cell contacts, within the second battery pack housing part of the battery pack housing, wherein the second battery pack housing part is configured as a mold for the casting compound, the accumulator cells have cell shells, the accumulator cells are pouch cells, and the cell contacts are cell tabs;

b) enclosing the cell contacts and the at least one circuit board by the casting compound, wherein the casting compound reaches at least up to the cell shells; and c) disposing the accumulator cells within the battery pack housing and closing the second battery pack housing part and the first battery pack housing part of the battery pack housing by each other.

13. The method according to claim 12, wherein the step c) comprises:

disposing and closing while the casting compound is in a liquid state; and the method further comprises:

d) hardening the casting compound in a solid state.

14. A battery pack for supplying an electrically driven treatment apparatus with an electric driving power, the battery pack comprising:

a plurality of accumulator cells having cell contacts;

at least one circuit board electrically connected to the cell contacts; and a battery pack housing, wherein the battery pack housing has a first battery pack housing part and a second battery pack housing part, the first battery pack housing part and the second battery pack housing part are closed by each other, and the accumulator cells are disposed within the battery pack housing and the at least one circuit board is disposed within the battery pack housing, wherein the second battery pack housing part is a housing cover, the second battery pack housing part having at least one thread, the first battery pack housing part is a housing container, the first battery pack housing part having at least one head abutment surface, the head abutment surface is disposed on an end adjacent to and within 20 millimeters or less of the second battery pack housing part, the battery pack has at least one screw, the screw is screwed into the thread for mechanical connection of the second battery pack housing part and the first battery pack housing part to each other, a screw head bears on the head abutment surface, the first battery pack housing part has at least one groove to guide the battery pack in mechanical connection to the treatment apparatus, and the groove extends on the head abutment surface in prolongation of the thread.

15. A treatment system, comprising:

a battery pack according to claim 14, and an electrically driven treatment apparatus, wherein the battery pack and the treatment apparatus are configured for electrical connection with each other for supplying the treatment apparatus with electric driving power from the battery pack.

* * * * *